(12) United States Patent
Farmer et al.

(10) Patent No.: US 11,312,808 B2
(45) Date of Patent: Apr. 26, 2022

(54) AQUEOUS POLYURETHANE DISPERSIONS, PREPOLYMERS, AND SHAPED ARTICLES MADE THEREFROM

(71) Applicant: THE LYCRA COMPANY LLC, Wilmington, DE (US)

(72) Inventors: Douglas K Farmer, Greensboro, NC (US); Carmen A Covelli, Chadds Ford, PA (US); Hong Liu, Waynesboro, VA (US); Laura E Lange, Philadelphia, PA (US); Tianyi Liao, Chadds Ford, PA (US); Kofi Bissah, Newark, DE (US)

(73) Assignee: THE LYCRA COMPANY LLC, Wilmington, DE (US)

(*) Notice: Subject to any disclaimer, the term of this patent is extended or adjusted under 35 U.S.C. 154(b) by 48 days.

(21) Appl. No.: 16/324,850

(22) PCT Filed: Apr. 25, 2017

(86) PCT No.: PCT/US2017/029360
§ 371 (c)(1),
(2) Date: Feb. 11, 2019

(87) PCT Pub. No.: WO2018/034709
PCT Pub. Date: Feb. 22, 2018

(65) Prior Publication Data
US 2019/0284325 A1    Sep. 19, 2019

Related U.S. Application Data

(60) Provisional application No. 62/376,003, filed on Aug. 17, 2016.

(51) Int. Cl.
| | | |
|---|---|---|
| C08G 18/08 | (2006.01) | |
| C08G 18/12 | (2006.01) | |
| C08G 18/28 | (2006.01) | |
| C08G 18/34 | (2006.01) | |
| C08G 18/48 | (2006.01) | |
| C08G 18/75 | (2006.01) | |
| C08K 5/00 | (2006.01) | |
| C08K 5/17 | (2006.01) | |
| C08K 3/013 | (2018.01) | |
| C08K 3/36 | (2006.01) | |
| C08G 18/66 | (2006.01) | |
| C08G 18/10 | (2006.01) | |

(52) U.S. Cl.
CPC ..... *C08G 18/0823* (2013.01); *C08G 18/0866* (2013.01); *C08G 18/10* (2013.01); *C08G 18/12* (2013.01); *C08G 18/282* (2013.01); *C08G 18/2825* (2013.01); *C08G 18/348* (2013.01); *C08G 18/48* (2013.01); *C08G 18/4854* (2013.01); *C08G 18/6692* (2013.01); *C08G 18/758* (2013.01); *C08K 3/013* (2018.01); *C08K 3/36* (2013.01); *C08K 5/005* (2013.01); *C08K 5/17* (2013.01); *C08G 2280/00* (2013.01)

(58) Field of Classification Search
CPC .. C08G 18/0823; C08G 18/12; C08G 18/282; C08G 18/348; C08G 18/48; C08G 2280/00; C08G 18/758; C08G 18/0866; C08K 5/17; C08K 3/013; C08K 3/36; C08K 5/005
See application file for complete search history.

(56) References Cited

U.S. PATENT DOCUMENTS

| | | | |
|---|---|---|---|
| 4,387,181 A | 6/1983 | Brown et al. | 524/714 |
| 5,270,433 A | 12/1993 | Klauck et al. | 524/158 |
| 5,563,208 A | 10/1996 | Konig et al. | 524/591 |
| 5,703,193 A | 12/1997 | Rosenberg et al. | 528/44 |
| 6,555,613 B1 | 4/2003 | Poth et al. | 524/589 |
| 6,586,523 B1 | 7/2003 | Blum et al. | 524/840 |
| 7,240,371 B2 | 7/2007 | Liu et al. | 2/69 |
| 7,341,500 B2 | 3/2008 | Horn et al. | 450/95 |
| 7,945,970 B2 | 5/2011 | Belluye et al. | 2/69 |
| 7,950,069 B2 | 5/2011 | Lee | 2/227 |
| 9,346,932 B2 | 5/2016 | Liu et al. | |
| 2003/0220463 A1 | 11/2003 | Becharn et al. | 528/44 |
| 2004/0014880 A1 | 1/2004 | Kuba et al. | 524/589 |
| 2006/0173151 A1* | 8/2006 | Kim | C08G 18/0823 528/44 |
| 2008/0004395 A1* | 1/2008 | Covelli | C08G 18/4854 524/591 |
| 2009/0181599 A1 | 7/2009 | Farmer et al. | 450/39 |
| 2010/0064409 A1 | 3/2010 | Buckley | 2/67 |
| 2011/0171890 A1* | 7/2011 | Nakayama | B24B 37/24 451/526 |
| 2011/0214216 A1 | 9/2011 | Zarabi | 2/69 |

FOREIGN PATENT DOCUMENTS

| | | |
|---|---|---|
| CN | 101220133 | 7/2008 |
| CN | 101173031 | 11/2010 |
| EP | 0519135 | 11/1996 |
| EP | 2280916 | 7/2013 |
| GB | 2477754 | 8/2011 |
| JP | 2015004040 | 1/2015 |
| WO | 2013154445 | 10/2013 |
| WO | 2015194672 | 12/2015 |

OTHER PUBLICATIONS

International Search Report and Written Opinion in PCT/US2017/02950, dated Jul. 17, 2017, PCT.
International Preliminary Report on Patentability in PCT/US2017/029350, dated Feb. 19, 2019, PCT.
English language translation of Search Report in CN Application No. 201780050237.2, dated Nov. 17, 2021, CN.

* cited by examiner

*Primary Examiner* — Robert D Harlan
(74) *Attorney, Agent, or Firm* — Bridget C. Sciamanna; Kathleen A. Tyrrell

(57) ABSTRACT

Aqueous polyurethane dispersions, prepolymers for formation of these dispersions, methods for their use in shaping articles, as well as shaping articles produced thereby are provided.

21 Claims, 3 Drawing Sheets ns, PREPOLYMERS, AND SHAPED ARTICLES
AQUEOUS POLYURETHANE DISPERSIOMADE THEREFROM

CROSS-REFERENCE TO RELATED APPLICATIONS

This application claims the benefit of U.S. Provisional Application No. 62/376,003, filed on Aug. 17, 2016. The entire contents of which are incorporated by reference herein.

FIELD OF THE INVENTION

The present invention relates to prepolymers and aqueous polyurethane dispersions made therefrom, as well as to shaping articles and films made from these dispersions and methods for their use in shaping articles.

BACKGROUND

A shaping garment is designed to temporarily alter the wearer's body shape to achieve a more fashionable figure. In recent years, fashion trends have tended to embrace clothing and apparel designs that increasingly accentuate natural curves of the human body, and the shape wear has been a growing trend in the market. The primary application has been in women's apparel, such as inner wear, lingerie, jeans and woven pants. Many women consumers look for a comfortable garment that enhances her shape while highlighting her best features, for example, a shaping jean that can slim the tummy, tighten the thigh and lift the buttock. Such a garment improves the appearance and self-esteem of the wearer.

Current techniques for shaping primarily use different yarn loop structures with long float stitch, higher denier or high draft of elastic fiber; or to apply a special silhouette pattern in strategically selected areas. Other common practice includes introducing second layers of fabric or pad sewn with base fabric, or selecting the fabrics with different elasticity and sewing together in different positions. See for example, U.S. Pat. Nos. 7,950,069, 7,341,500, and 7,945,970, WO2013/154445 A1, U.S. Patent Application Publication Nos. 2010/0064409A1 and 2011/0214216A1, GB2477754A and EP 0519135B1. In one design, a rigid panel is added inside of the jean in front of the belly to help slenderize the stomach. In another, a piece of padding or sponge is inserted into trousers to lift and enhance a visual buttock profile of the wearer. However, all these designs and methods compromise the wearers' comfort and often are visible from the garment surface.

Polyurethanes (including polyurethaneureas) can be used as adhesives for various substrates, including textile fabrics. Typically, such polyurethanes are either fully formed non-reactive polymers or reactive isocyanate-terminated prepolymers. Such reactive polyurethane adhesives often require extended curing time to develop adequate bonding strength, which can be a disadvantage in manufacturing processes. In addition, the isocyanate groups of the polyurethanes are known to be sensitive to moisture, which limits the storage stability and reduces the shelf life of the product incorporating such polyurethanes. Typically, such polymers, when fully formed, are either dissolved in a solvent (solvent borne), dispersed in water (water borne), or processed as thermoplastic solid materials (hot melt). Notably, solvent-based adhesives face ever-tightening health and environmental legislation aimed at reducing volatile organic compound (VOC) and hazardous air pollutant (HAP) emissions. Accordingly, alternatives to conventional solvent-based products are needed.

Hot-melt adhesives, although environmentally safe and easily applied as films, generally have high set and poor recovery when subject to repeated stretch cycles. Therefore, improvements are needed.

Many attempts have been made to develop water borne polyurethane adhesives to overcome these deficiencies.

U.S. Pat. No. 5,270,433 discloses an "adhesive composition comprising a substantially clear and solvent-free, aqueous, one-component polyurethane dispersion containing the reaction products of (a) a polyol mixture comprising polypropylene glycol, (b) a mixture of polyfunctional isocyanates comprising $\alpha\alpha\alpha_1\alpha_1$-tetramethyl xylene diisocyanate (TMXDI), (c) a functional component capable of salt formation in aqueous solution, and (d) optionally, a chain-extending agent." The adhesive films from this composition have low recovery power and poor heat resistance in view of the unsymmetrical structure and steric hindrance of isocyanate groups on TMXDI, preventing the formation of strong inter-chain urea hydrogen bonds in the hard segments of the polymer.

U. S. Patent Application Publication No, 2004/0014880 A1 discloses an aqueous polyurethane dispersion for adhesive bonding in wet and dry laminations stated to have superior coatability, adhesive strength and heat resistance. This dispersion contains a substantial amount of organic solvent—methyl ethyl ketone (MEK).

U.S. Patent Application Publication No. 2003/0220463 A1 discloses a method for making a polyurethane dispersion that is free of organic solvent such as N-methylpyrrolidone (NMP). However, the composition is limited to a prepolymer having low free diisocyanate species, such as methylene bis(4-phenylisocyanate) (4,4'-MDI). The process to produce such a prepolymer with low free diisocyanate is complicated (as disclosed in U.S. Pat. No. 5,703,193). Such processing also requires short path distillation of the free diisocyanate and is thus not economical in producing a prepolymer for making a polyurethane dispersion.

U.S. Pat. No. 4,387,181 discloses a stable aqueous polyurethane dispersion, containing N-methylpyrrolidone (NMP) solvent, prepared by reaction of carboxylic group-containing oxime-blocked, isocyanate-terminated prepolymer and polyamine. The prepolymer is made by reaction of aromatic diisocyanates, such as 4,4'-diphenylmethanediisocyanate (MDI) or toluene diisocyanate (TDI), with polyether or polyester polyols and a dihydroxy alkanoic acid. The oxime-blocked isocyanate groups are capable of reacting with polyamine at 60 to 80° C., within 6 to 18 hours. The dispersion is stable in storage, and the film formed from the dispersion has good tensile properties. However, this dispersion still has organic solvent present and the longer curing time needed is unsuitable for fabric bonding and lamination in practice.

U.S. Pat. No. 5,563,208 describes an acetone process to prepare an essentially solvent-free aqueous polyurethane dispersion, comprising urethane prepolymers with blocked isocyanate groups and polyamines within the molecular weight range of 60 to 400 in a molar ratio of blocked isocyanate groups to primary and/or secondary amino groups of from 1:0.9 to 1:1.5. This dispersion is stable in storage at room temperatures and gives a heat-resistant binder in coating. It requires long curing time (up to 30 minutes), which is still not suitable for fabric bonding and adhesion. Furthermore, the acetone process requires an additional distillation step to remove the acetone from the dispersion, which makes this process less economical.

U.S. Pat. No. 6,586,523 describes an acetone process for preparing a self-crosslinking polyurethane dispersion for sizing agents, comprising a prepolymer with isocyanate groups partially blocked and partially extended, and excess polyfunctional compounds having molecular weights from 32 to 500 with primary or secondary amino and/or hydroxyl groups. This dispersion composition reduces the curing time to some degree, but still has deficiencies because an additional distillation step to remove the acetone is required.

U.S. Pat. No. 6,555,613 describes a solvent-free aqueous dispersion of a reactive polyurethane having a number average molecular weight (Mn) of from 800 to 14,000, a degree of branching of from 0.0 to 3.0 mol/kg, and an isocyanate functionality from 2.0 to 6.0 per mole. The polyurethane is made from a polyester polyol, a polyisocyanate and polyisocyanate adduct, with low molecular weight polyol and anion-forming units after neutralizing incorporated in the polymer chains, and with blocked isocyanate groups capable of further reactions for crosslinking. The result of such dispersion is a coating material that is hard, glossy and elastic, but such coating material does not have the elastomeric features and stretch/recovery properties required for an adhesive to be used with stretch fabrics.

Polymer compositions such as polyurethaneurea films and tapes comprising fully formed polyurethaneurea with blocked isocyanate end groups are disclosed in U.S. Pat. No. 7,240,371. These compositions are prepared from solvent-free systems of prepolymers comprising at least one polyether or polyester polyoyl, a mixture of MDI isomers and a diol.

U.S. Pat. No. 9,346,932 discloses aqueous polyurethane dispersions provided in solvent-free systems of a prepolymer comprising at least one polyether, polyester, or polycarbonate polyol, a mixture of MDI isomers, and a diol and shaped three dimensional articles formed therefrom.

Carmen, C. et al. disclose a method to add polymer composition on the edge of garments to form the garment edge bands and to add film on garments such as brassiere to form laminate fabrics in patent EP 2280619B1 and published U.S. Patent Application Publication No. 2009/0181599A1 discloses fabric laminates or fabric bands having multiple layered structures, including at least one fabric layer and at least one polymer layer that have been attached or bonded together.

Other examples of polymer compositions are polyurethane tapes such as those commercially available from Bemis, and polyolefin resins that can be formed into films such as those commercially available from ExxonMobil under the trade name VISTAMAXX. These films may be bonded to fabric with application of heat.

SUMMARY

An aspect of the present disclosure relates to a prepolymer for use in an aqueous polyurethane dispersion. The prepolymer comprises a glycol, an aliphatic diisocyanate and a diol. In one embodiment, the prepolymer further comprises 1-hexanol. A ratio of isocyanate groups in the aliphatic diisocyanate to hydroxy groups in the glycol and the diol is about 1.30 to about 2.20, or about 1.30 to about 2.00. A concentration range of carboxylic acid groups in milliequivalent per kg of prepolymer (Meq Acid/kg CG) is about 140 to about 250 or about 150 to about 220.

Another aspect of the present disclosure relates to an aqueous polyurethane dispersion, comprising a prepolymer which comprises a glycol, an aliphatic diisocyanate, and a diol, and optionally 1-hexanol. The aqueous polyurethane dispersion may further comprise water, a neutralizer, a surfactant, a defoamer, an antioxidant and/or a thickener. The neutralizer may be triethylamine (TEA) and/or 2-Dimethylamino-2-Methyl-1-Propanol (DMAMP).

The present disclosure also relates to shaped articles, e.g., films, derived from these aqueous polyurethane dispersions having improved resistance to discoloration from oxidation, and improved tensile properties, e.g., tenacity, load and unload power, and stretch and recovery. The shaped article may be applied to a substrate in a region where improved stretch or tension is desired.

Yet another aspect of the present disclosure relates to a method for producing a shaped article which comprises applying the aqueous polyurethane dispersion to a substrate and curing the aqueous polyurethane dispersion to the substrate.

DETAILED DESCRIPTION

Figure 1:
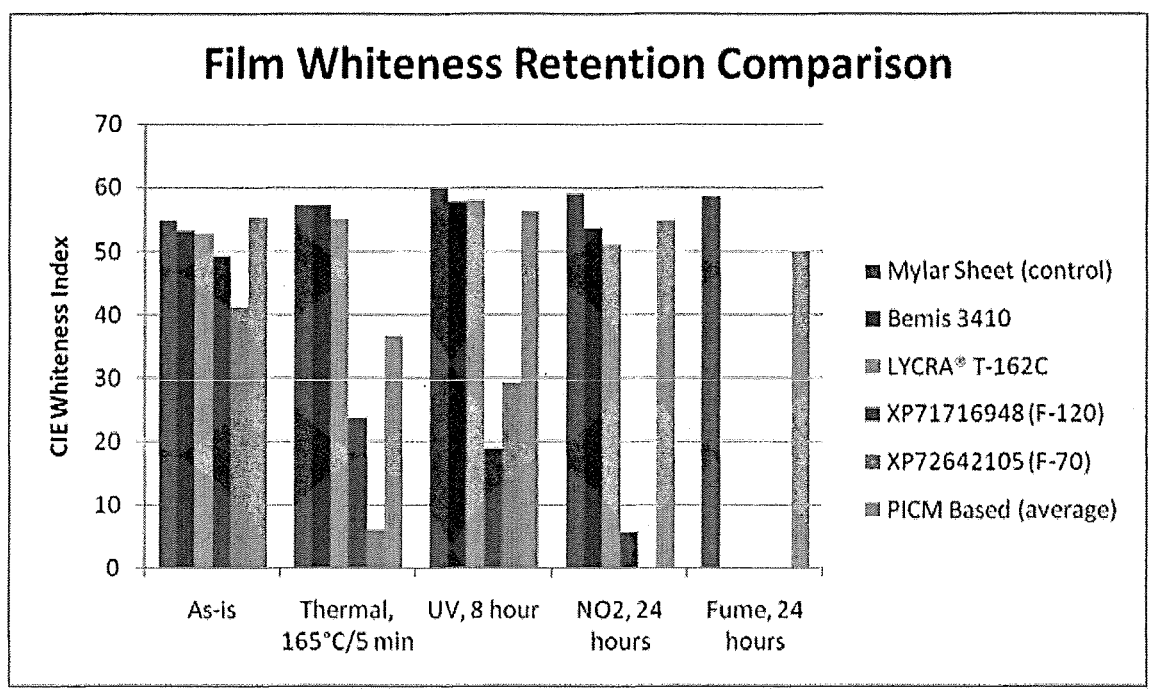
FIG. 1 is a bar graph depicting film whiteness retention for six film samples after thermal exposure.

Aqueous polyurethane dispersions falling within the disclosure are provided from particular urethane prepolymers, which also are disclosed herein. The aqueous polyurethane dispersions and prepolymers do not contain an organic solvent or cosolvent, alkyl ethoxylates or organotin catalyst. Shaped articles, including films, produced by application of the aqueous polyurethane dispersions to substrates including textile fabrics are also disclosed. The dispersion can be applied by padding, coating, printing, bonding, laminating or other treatment methods and then cured (or dried) with a residence time of about 1 to about 5 minutes. Upon drying, such articles exhibit high stretch and recovery, improved chlorine resistance, and improved whiteness retention, among other benefits.

As used herein, the term "dispersion" refers to a system in which the disperse phase consists of finely divided particles, and the continuous phase can be a liquid, solid or gas.

As used herein, the term "aqueous polyurethane dispersion" refers to a composition containing at least a polyurethane or polyurethane urea polymer or prepolymer (such as the polyurethane prepolymer described herein) that has been dispersed in an aqueous medium, such as water, including de-ionized water.

A dried aqueous polyurethane dispersion, as used herein, is an aqueous polyurethane dispersion that has been subjected to curing or drying by any suitable method. The dried aqueous polyurethane dispersion may be in the form of a shaped article, e.g., a film.

As used herein, the term "solvent," unless otherwise indicated, refers to a non-aqueous medium, wherein the non-aqueous medium includes organic solvents, including volatile organic solvents (such as acetone) and somewhat less volatile organic solvents (such as MEK, or NMP).

As used herein, the term "essentially solvent-free" or "essentially solvent-free system" refers to a composition or dispersion wherein the bulk of the composition or dispersed components has not been dissolved or dispersed in a solvent.

As used herein, the term "shaped article" may refer to one of a number of objects including for example, film, tape, dots, webs, stripes, bead, and foam. In an embodiment, the shaped article is a film. A film may describe a sheet material of any shape and may be a layer (or layers) having a length and width of dried aqueous polyurethane dispersion, that may or may not require application to a substrate for support. The film may be continuous or discontinuous, shaped or free-formed. In an embodiment, the film may be substantially two-dimensional and/or relatively flat. A tape may describe a film in narrow strip form. A film may be in the for a of a tape. As used herein, the term "shaped article" is a layer comprising an aqueous polyurethane dispersion containing the polyurethane prepolymer described herein, which may be dried, that mat be applied to a substrate or release paper, which can be used for adhesion and/or to form a rigid or an elastic article.

An article is a formed substrate or textile fabric. The article may be a garment. The article preferably comprises a dried aqueous polyurethane dispersion, which may be in the form of a shaped article, and a substrate, for example a textile fabric, which may or may not have at least one elastic property, in part, due to the application of the aqueous polyurethane dispersion or shaped article as described herein. The article may be in any suitable configuration such as one-dimensional, two-dimensional and/or three-dimensional.

As used herein, the term "narrow strip" refers to a shape having a length and a width where the length is at least twice the width. The length may vary and depends on the size of the garment to which it is applied.

As used herein, the term "textile fabric" refers to a knitted, woven or nonwoven material. The knitted fabric may be flat knit, circular knit, warp knit, narrow elastic, and/or lace. The woven fabric may be of any construction, for example sateen, twill, plain weave, oxford weave, basket weave, and/or narrow elastic. The nonwoven material may be meltblown, spun bonded, carded fiber-based staple webs, and the like.

As used herein, the term "substrate" refers to any material to which a shaped article or aqueous polyurethane dispersion can be applied. A substrate can be substantially one dimensional as in a fiber, two dimensional as in a planar sheet, or a three dimensional article or a bumpy sheet. A planar sheet for example may comprise textile fabric, paper, flocked article, and/or web. A three dimensional article for example may comprise leather and/or foam. Other substrates may comprise wood, paper, plastic, metal, and composites such as concrete, asphalt, gymnasium flooring, and plastic chips.

As used herein, the term "hard yarn" refers to a yarn which is substantially non-elastic.

As used herein, the term "molded" article refers to a process by which the shape of an article or shaped article is changed in response to application of heat and/or pressure.

As used herein, the term "derived from" refers to forming a substance out of another object. For example, a shaped article may be derived from a dried aqueous dispersion.

As used herein, the term "modulus", also known as the elastic modulus, is a measure of the stiffness of a fabric.

Prepolymers for use in the aqueous polyurethane dispersions of the present disclosure comprise a glycol, an aliphatic diiisocyanate and a diol.

Glycol components suitable as a starting material for preparing prepolymers disclosed herein include polycarbonates, and polyesters, polycarbonate glycols, polyether glycols, and polyester glycols.

Examples of polyether glycols that can be used include, but are not limited to, those glycols with two or more hydroxy groups, from ring-opening polymerization and/or copolymerization of ethylene oxide, propylene oxide, trimethylene oxide, tetrahydrofuran, and 3-methyltetrahydrofuran, or from condensation polymerization of a polyhydric alcohol, preferably a diol or diol mixtures, with less than 12 carbon atoms in each molecule, such as ethylene glycol, 1,3-propanediol, 1,4-butanediol, 1,5-pentanediol 1,6-hexanediol, neopentyl glycol, 3-methyl-1,5-pentanediol, 1,7-heptanediol, 1,8-octanediol, 1,9-nonanediol, 1,10-decanediol and 1,12-dodecanediol. A linear, bifunctional polyether polyol is preferred, and a poly(tetramethylene ether) glycol of molecular weight of about 1,700 to about 2,100, such as Terathane® 1800 (Invista) with a functionality of 2, is used in an embodiment.

Examples of polyester glycols that can be used include those ester glycols with two or more hydroxy groups, produced by condensation polymerization of aliphatic polycarboxylic acids and polyols, or their mixtures, of low molecular weights with no more than 12 carbon atoms in each molecule. Examples of suitable polycarboxylic acids are malonic acid, succinic acid, glutaric acid, adipic acid, pimelic acid, suberic acid, azelaic acid, sebacic acid, undecanedicarboxylic acid and dodecanedicarboxylic acid. Example of suitable polyols for preparing the polyester polyols are ethylene glycol, 1,3-propanediol, 1,4-butanediol, 1,5-pentanediol 1,6-hexanediol, neopentyl glycol, 3-methyl-1,5-pentanediol, 1,7-heptanediol, 1,8-octanediol, 1,9-nonanediol, 1,10-decanediol and 1,12-dodecanediol. A linear, bifunctional polyester polyol with a melting temperature of about 5° C. to about 50° C. is used in an embodiment.

Examples of polycarbonate glycols that can be used include those carbonate glycols with two or more hydroxy groups, produced by condensation polymerization of phosgene, chloroformic acid ester, dialkyl carbonate or diallyl carbonate and aliphatic polyols, or their mixtures, of low molecular weights with no more than 12 carbon atoms in each molecule. Example of suitable polyols for preparing the polycarbonate polyols are diethylene glycol, 1,3-propanediol, 1,4-butanediol, 1,5-pentanediol, 1,6-hexanediol, neopentyl glycol, 3-methyl-1,5-pentanediol, 1,7-heptanediol, 1,8-octanediol, 1,9-nonanediol, 1,10-decanediol and 1,12-dodecanediol. A linear, bifunctional polycarbonate polyol with a melting temperature of about 5° C. to about 50° C. is used in an embodiment.

In an embodiment, the prepolymer contains at least about 60%, at least about 65%, or at least about 70% of the glycol, based upon total weight of the prepolymer. In another embodiment, the prepolymer contains about 60% to about 85%, about 65% to about 80%, about 68% to about 78%, or about 70% to about 77% of the glycol, based upon total weight of the prepolymer.

Any aliphatic diisocyanate may be used in the disclosure. In on embodiment, the isocyanate is a dicyclohexylmethane diisocyanate, preferably including a mixture of its isomers. An example of a suitable isocyanate component is a dicyclohexylmethane diisocyanate or 4,4'-methylene bis (cyclohexyl isocyanate) ("PICM") such as Vestanate® H12MD1 (Evonik) or Desmodur® W (Covestro).

In an embodiment, the prepolymer contains at least about 10%, at least about 20%, at least about 22%, or at least about 24% of the isocyanate, based upon total weight of the prepolymer. In another embodiment, the prepolymer contains about 15% to about 35%, about 13% to about 32%, about 20% to about 30%, or about 22% to about 27% of the isocyanate, based upon total weight of the prepolymer.

Diols suitable as further starting materials for preparing prepolymers disclosed herein, include at least one diol with two hydroxy groups capable of reacting with the isocyanate and at least one carboxylic acid group capable of forming salt upon neutralization and incapable of reacting with the isocyanate. Examples of diols having a carboxylic acid group include, but are not limited to 2,2-dimethylolpropionic acid (such as DMPA® from GEO Specialty Chemicals and Bis-MPA from Perstorp), 2,2-dimethylobutanoic acid, 2,2-dimethylovaleric acid, and DMPA initiated caprolactones such as CAPA™ HC 1060 (Solvay). In an embodiment, the diol is DMPA.

In an embodiment, the prepolymer may contain at least about 1%, or at least about 2.2%, or at least about 2.4% of the diol, based upon total weight of the prepolymer. In another embodiment, the prepolymer contains about 1.5% to about 3.5%, about 2.0% to about 3.0%, about 2.2% to about 2.8%, or about 2.4% to about 2.5% of the diol, based upon total weight of the prepolymer.

The prepolymer may contain at least about 60% glycol, at least about 10% isocyanate and at least about 1% diol, based upon total weight of the prepolymer. The prepolymer may contain at least about 70% glycol, at least about 20% isocyanate and at least about 2.2% diol, based upon total weight of the prepolymer. The prepolymer may contain about 60% to about 80% glycol, about 15% to about 35% isocyanate, and about 1.5% to about 3.5% diol, based upon total weight of the prepolymer.

In an embodiment, the prepolymer further comprises a monofunctional alcohol, such as but not limited to methanols, ethanols, propanols, butanols and 1-hexanol. The prepolymer may contain less than about 1%, less than about 0.6%, or less than about 0.5% of the monofunctional alcohol, based upon total weight of the prepolymer. In another embodiment, the prepolymer contains about 0.20% to about 0.70%, about 0.25% to about 0.60%, about 0.31% to about 0.55%, or about 0.31% to about 0.51% of the monofunctional alcohol, based upon total weight of the prepolymer.

In an embodiment, the prepolymer further comprises 1-hexanol. The prepolymer may contain less than about 1%, less than about 0.6%, or less than about 0.5% of the 1-hexanol, based upon total weight of the prepolymer. In another embodiment, the prepolymer contains about 0.20% to about 0.70%, about 0.25% to about 0.60%, about 0.31% to about 0.55%, or about 0.31% to about 0.51% of the 1-hexanol, based upon total weight of the prepolymer.

When the prepolymer contains 1-hexanol, it may comprise at least about 60% glycol, at least about 10% isocyanate, at least about 1% diol and less than about 1% 1-hexanol, based upon total weight of the prepolymer. In another embodiment, the prepolymer comprises at least about 70% glycol, at least about 20% isocyanate, at least about 2.2% diol and less than about 0.6% 1-hexanol, based upon total weight of the prepolymer. The prepolymer may contain about 60% to about 80% glycol, about 15% to about 35% isocyanate, about 1.5% to about 3.5% diol and about 0.20% to about 0.70% 1-hexanol, based upon total weight of the prepolymer.

The prepolymer may be formulated to have an NCO/OH ratio, the molar ratio of isocyanate groups to hydroxy groups, of about 1.30 to about 2.20, about 1.30 to about 2.00, about 1.40 to about 1.90, or about 1.50 to about 1.85. The NCO groups are from the isocyanate and the OH groups are from the glycol and the diol. It was found that if the NCO/OH ratio is too low, the prepolymer viscosity will be too high to be dispersed. In addition, a low NCO/OH ratio results in low recovery ability for the films of the dried aqueous polyurethane dispersions disclosed herein. On the other hand, a NCO/OH ratio that is too high causes the films to lose elasticity or stretch elongation.

It is believed that the addition of monol in the prepolymer reduces the viscosity as it limits the molecular weight growth. To make the prepolymer dispersible, lower viscosity is preferred. In an embodiment, the viscosity is below about 3000 poises @40° C., preferably below about 2500 poises @40° C. and more preferably below about 2000 poises @40° C. The viscosity may be between about 3000 to about 500 poises @40° C., about 2500 to about 600 poises @40° C., or about 2000 to about 700 poises @40° C.

The prepolymer may be formulated to have a specific Meq Acid/kg CG, where Meq is the milliequivalent of the specific functional groups, here carboxylic acid, per kg of the prepolymer or capped glycol (CG). The carboxylic acid group is from a diol such as DMPA, which has two hydroxy groups capable of reacting with the diisocyanate and has one carboxylic acid group incapable of reacting with the diisocyanate. The prepolymer may be formulated to have a concentration range of the carboxylic acid groups in milliequivalent per kg of prepolymer from about 140 to about 250, about 150 to about 230, about 150 to about 220, about 155 to about 220, about 170 to about 190, or about 185.

Importantly, the amount of acid in the prepolymer contributes to the viscosity of the prepolymer and the stability of the aqueous dispersion made from the prepolymer. For example, if the concentration of acid is too high, that means the diol concentration will be high, the prepolymer formed will have high viscosity and thus will not properly disperse into water to form an uniform dispersion with small particle sizes. If the concentration of acid is too low, it will not provide adequate hydrophilic sites after the neutralization, and the aqueous dispersion made from the prepolymer will not be stable.

In an embodiment, the prepolymer may be formulated to have an NCO/OH ratio of about 1.30 to about 2.00, or about 1.40 to about 1.90, and an acid concentration range of about 150 to about 220 milliequivalent per kg of prepolymer, about 155 to about 220 milliequivalent per kg of prepolymer, or about 180 to about 190 milliequivalent per kg of prepolymer. It was found that aqueous dispersions made from these prepolymers have good processability and stability, and the films cast from the aqueous dispersions made from these prepolymers have good whiteness retention and elasticity.

The prepolymer can be prepared by mixing the glycol, isocyanate and diol together in one step and by reacting at temperatures of about 50° C. to about 100° C. for adequate time until all hydroxy groups are essentially consumed and a desired % NCO of the isocyanate group is achieved. Alternatively, this prepolymer can be made by charging molten glycol into a reactor at about 55° C. followed by addition of a DMPA solid powder with agitation and circulation until the diol solid particles are dispersed and dissolved in the glycol. Molten isocyanate is then charged into the reactor with continuous agitation and the capping reaction is allowed to take place at about 90° C. for about 240 minutes, still with continuous agitation. Optionally, a tin-free catalyst such as K-KAT® XK-640 (King Industries Specialty Chemicals) can be used to accelerate the prepolymer formation. The formed viscous prepolymer is then sampled to determine the extent of the reaction by measuring the weight percentage of the isocyanate groups (% NCO)

of the prepolymer through a titration method. The theoretical value of the % NCO after the reaction is completed is 2.97 assuming the glycol MW is at 1800. If the determined % NCO value is higher than the theoretical value, the reaction should be allowed to continue until the theoretical value is reached or the % NCO number becomes constant. Once it is determined that the reaction is complete, the prepolymer temperature is maintained between 85° C. and 90° C. Significantly, the prepolymers are essentially solvent free and contain no alkyl ethoxylates or organotin catalysts. Preferred is that the reaction to prepare the prepolymer be carried out in a moisture-free, nitrogen-blanketed atmosphere to avoid side reactions.

The prepolymer of the present disclosure may be used to produce an aqueous polyurethane dispersion. The aqueous polyurethane dispersion may contain about 30% to about 55%, or about 35% to about 48% prepolymer, based upon total weight of the aqueous polyurethane dispersion.

The prepolymer may be added in an amount such that the aqueous polyurethane dispersion contains at least about 25% or at least about 30% glycol, at least about 5%, or at least about 10% isocyanate, and at least about 1% diol, based upon total weight of the aqueous polyurethane dispersion. In another embodiment, the prepolymer may be added in an amount such that the aqueous polyurethane dispersion contains about 25% to about 35% glycol, about 5% to about 15% isocyanate, and about 0.5% to about 1.5% diol, based upon total weight of the aqueous polyurethane dispersion. In a further embodiment, the prepolymer may be added in an amount such that the aqueous polyurethane dispersion contains about 30% glycol, about 10% isocyanate, and about 1% diol, based upon total weight of the aqueous polyurethane dispersion.

The aqueous polyurethane dispersion may further contain one or more of water, a neutralizer, a surfactant, a defoamer, an antioxidant and a thickener. The aqueous polyurethane dispersion may contain water, a neutralizer, a surfactant, a defoamer, an antioxidant and a thickener.

In an embodiment, the prepolymer, containing carboxylic acid groups along the polymer chains, can be dispersed with a high-speed disperser into a de-ionized water medium that comprises: at least one neutralizing agent to form an ionic salt with the acid; at least one surface active agent (ionic and/or non-ionic dispersant or surfactant); and, optionally, at least one diamine chain extension component. Alternatively, the neutralizing agent can be mixed with the prepolymer before being dispersed into the water medium. At least one antifoam and/or defoam agent and at least one rheological modifier can be added to the water medium before, during, or after the prepolymer is dispersed.

The aqueous polyurethane dispersion may contain at least about 50% water, at least about 1% surfactant, at least about 1% thickener, less than about 1% neutralizer, less than about 1% antioxidant, and less than about 1% defoamer, based upon total weight of the aqueous polyurethane dispersion.

Water may be present in about 40% to about 60%, or about 50%, based upon total weight of the aqueous polyurethane dispersion.

Neutralizers used in these dispersions must be capable of converting the acid groups to salt groups. Examples include, but are not limited to tertiary amines (such as triethylamine (TEA), N,N-diethylmethylamine, N-methylmorpholine, N,N-diisopropylethylamine, 2-dimethylamino-2-methyl 1-propanol (DMAMP) and triethanolamine) and alkali metal hydroxides (such as lithium, sodium and potassium hydroxides). Primary and/or secondary amines may be also used as the neutralizers for the acid groups. The degrees of neutralization are generally between about 60% to about 140%, for example, in the range of about 80% to about 120% of the acid groups. The neutralizer may be present in about 0.5% to about 0.9%, based upon total weight of the aqueous polyurethane dispersion.

The neutralizer may comprise TEA, or may comprise TEA and a second neutralizer. The neutralizer may comprise TEA and DMAMP.

The neutralizer may comprise DMAMP. The aqueous polyurethane dispersion may comprise about 0.2% to about 2.0%, or about 0.5% to about 1.5% of DMAMP, based upon total weight of the aqueous polyurethane dispersion. The aqueous polyurethane dispersion disclosed herein may be free from TEA. "Free from," as used herein, means that there is less than about 0.01% of TEA, and preferably 0.00% of TEA, based upon total weight of the aqueous polyurethane dispersion. In an embodiment, the aqueous polyurethane dispersion contains less than about 0.1% of TEA, based upon total weight of the aqueous polyurethane dispersion.

The neutralizer may comprise DMAMP and a second neutralizer, wherein the second neutralizer is not TEA. The second neutralizer may be, but is not limited to tertiary amines (other than TEA, such as N,N-diethylmethylamine, N-methylmorpholine, N,N-diisopropylethylamine, 2-dimethylamino-2-methyl 1-propanol and triethanolamine), alkali metal hydroxides (such as lithium, sodium and potassium hydroxides), primary, secondary amines, or any combination thereof. When present, the aqueous polyurethane dispersion may comprise about 0.3% to about 2.0% of DMAMP, and 0.1% to about 1.0% of a second neutralizer, based upon total weight of the aqueous polyurethane dispersion. The aqueous polyurethane dispersion may comprise about 0.5% to about 12% of DMAMP, and about 0.2% to about 0.8% of a second neutralizer, based upon total weight of the aqueous polyurethane dispersion, in order to keep the degree of neutralization in between of 60% to 140%.

Water may function as a chain extender for the prepolymer. Optionally, a diamine such as ethylenediamine (EDA) can be used a coextender.

Examples of surfactants include, but are not limited to, anionic, cationic, or nonionic dispersants or surfactants, such as alkyldiphenyloxide disulfonate, sodium dodecyl sulfate, sodium dodecylbenzenesulfonate, ethoxylated nonyphenols, and lauryl pyridinium bromide. The surfactant may be present in about 1.0% to about 5.0%, about 1.0% to about 2.0%, or about 1.0% to about 1.5%, based upon total weight of the aqueous polyurethane dispersion.

Examples of suitable defoamers include, but are not limited to, mineral oils and/or silicone oils such as BYK 012 and Additive 65 (a silicone additive from Dow Corning), and Surfynol™ DF 110L (a high molecular weight acetylenic glycol non-ionic surfactant from Air Products & Chemicals). The defoamer may be present in about 0.1% to about 1.0%, about 0.1% to about 0.5%, or about 0.1% to about 0.3%, based upon total weight of the aqueous polyurethane dispersion.

Examples of suitable thickeners include, but are not limited to, polyurethanes such as Tafigel PUR 61 by Munzing, hydrophobically-modified ethoxylate urethanes (HEUR), hydrophobically-modified alkali swellable emulsions (HASE), and hydrophobically-modified hydroxy-ethyl cellulose (HMHEC). The thickener may be present in about 1.0% to about 5.0%, about 1.0% to about 2.0%, or about 1.0% to about 1.5%, based upon total weight of the aqueous polyurethane dispersion.

Examples of antioxidants include, but are not limited to hindered phenols such as Irganox 245 (BASF) or Cyanox 1790 (Cytec). The antioxidant may be present in about 0.3% to about 1.0%, about 0.5% to about 1.0%, or about 0.5% to about 0.8%, based upon total weight of the aqueous polyurethane dispersion.

Additionally, diamines including ethylene diamine and similar materials can be used as a diamine chain extender in place of water. Examples of suitable diamine chain extenders include: 1,2-ethylenediamine, 1,4-butanediamine, 1,6-hexamethylenediamine, 1,12-dodecanediamine, 1,2-propanediamine, 2-methyl-1,5-pentanediamine, 1,2-cyclohexanediamine, 1,4-cyclohexanediamine, 4,4'-methylene-bis(cyclohexylamine), isophorone diamine, 2,2-dimethyl-1,3-propanediamine, meta-tetramethylxylenediamine, and Jeffamine® (Texaco) of molecular weight less than 500.

Other additives that may be optionally included in the aqueous polyurethane dispersion or in the prepolymer include: anti-oxidants, UV stabilizers, silicones, mineral oils, colorants, pigments, delusterants, crosslinking agents, phase change materials (e.g., Outlast®, commercially available from Outlast Technologies, Boulder, Colo.), antimicrobials, minerals (e.g., copper), microencapsulated well-being additives (e.g., aloe vera, vitamin E gel, aloe vera, sea kelp, nicotine, caffeine, scents or aromas), nanoparticles (e.g., silica or carbon), calcium carbonate, flame retardants, anti-tack additives, chlorine degradation resistant additives, vitamins, medicines, fragrances, electrically conductive additives, and/or dye-assist agents (e.g., Methacrol®, commercially available from E. I. DuPont de Nemours, Wilmington, Del.). Other additives which may be added to the prepolymer or the aqueous dispersion comprise adhesion promoters, durability improvement agents, modulus modifiers, texturing agents, tackifiers, anti-static agents, anti-cratering agents, anti-crawling agents, optical brighteners, coalescing agents, electroconductive additives, luminescent additives, flow and leveling agents, freeze-thaw stabilizers, lubricants, organic and inorganic fillers, preservatives, texturizing agents, thermochromic additives, insect repellants, and wetting agents, and other additives known for use by those of ordinary skill in the art to achieve desired benefits and properties.

In an embodiment, a delusterant, such as titanium dioxide, may be added to the aqueous polyurethane dispersion. Any desired amount known in the art to impart the desired properties may be added. For example, about 0.2% to about 10%, based upon total weight of the aqueous polyurethane dispersion, of the delusterant may be added.

Such optional additives may be added to the aqueous polyurethane dispersion before, during, or after the prepolymer is dispersed, as the process allows. No organic solvent is added to the aqueous dispersion at any time.

In an embodiment, the dispersion may be prepared by the addition of the prepolymer using a rotor/stator high speed disperser. The prepolymer as made above is transferred directly into the disperser head and dispersed under high shear forces into deionized water preferably containing at least a surfactant, a neutralizer, an anti-oxidant and a foam control agent. Slightly more prepolymer than required by the dispersion recipe is needed to compensate for loss in the transfer line and in the reactor. Once the addition of the prepolymer is complete, a thickener can be added.

Aqueous polyurethane dispersions falling within the scope of the present disclosure should be expected to have a solids content of from about 10% to about 50% by weight, from about 30% to about 50% by weight, about 30% to about 45%, or about 35% to about 46%. The viscosity of aqueous polyurethane dispersions falling within the scope of the present disclosure may be varied in a broad range from about 10 centipoises to about 100,000 centipoises depending on the processing and application requirements. For example, in one embodiment, the viscosity is in the range of about 500 centipoises to about 30,000 centipoises. The viscosity may be varied by using an appropriate amount of thickening agent, such as from about 0 to about 5.0 wt %, based on the total weight of the aqueous polyurethane dispersion.

The aqueous polyurethane dispersions disclosed herein have a manufacturing advantage over other dispersions, specifically those that contain an aromatic isocyanate, instead of an aliphatic isocyanate. This is due primarily to the reactivity of an aliphatic isocyanate vs. an aromatic isocyanate. The aliphatic isocyanate used in the aqueous polyurethane dispersions disclosed herein reacts much slower when the prepolymer is dispersed in water, which allows adequate time for the viscous prepolymer to break apart into finer droplets. Thus, the dispersion has smaller and more uniform particles, which can be filtered easily by on-line filtration system. When an aromatic isocyanate is used instead, the dispersion reacts quickly in water, and can cause the prepolymer droplets to solidify before breaking into small particles. This leaves large amount of grit in the dispersion, which requires off-line filtration with reduced yield and productivity.

It has been found that upon drying, the dried aqueous polyurethane dispersion of the present disclosure may form a continuous elastic film with high stretch and recovery. Given that the films and fabrics are porous materials, it is recognized that the film or dispersion may partially or completely impregnate the fabric of the shaping article. For example, the dried aqueous polyurethane dispersion may form a layer which is partially separate from the surrounding layers, or may be completely transferred to the surrounding layer or layers to form an integrated article without a distinguishably separate film layer.

Further, the aqueous polyurethane dispersion is resistant to yellowing and hydrolysis. In particular, the aqueous polyurethane dispersion of the present disclosure, and shaped articles made therefrom, has been found to have improved whiteness retention (also referred to as improved resistance to oxidative discoloring (or yellowing)) as compared to other films or articles made from other dispersions known in the art, such as those containing an aromatic isocyanate. This is particularly important for consumer goods as yellowing or discoloration is particularly objectionable for garments and consumer goods.

A CIE whiteness index value is a whiteness measurement standard developed by the French-based International Commission on Illumination (also abbreviated as CIE) using D65 illumination representing outdoor daylight. Whiteness retention is a measurement of resistance to change in color after treatment or exposure, measured by the change in the CIE whiteness index value over time. Thus, improved whiteness retention of a fabric means that it has a greater resistance to change in color. As used herein and unless otherwise specified, the CIE whiteness index value (absolute value) is understood as that of a sample without a color effecting additive, such as a pigment, colorant, brightener, dye, or the like. One of ordinary skill in the art understands that such additives could be added to an aqueous polyurethane dispersion or shaped article which would alter the absolute value of the CIE whiteness index.

A shaped article, e.g., a film, coated on a Mylar® polyester sheet substrate and formed from the aqueous polyurethane dispersions disclosed herein may have a CIE whiteness index value of about 50 to about 60. After thermal exposure (exposure in a thermal chamber to heated air at 195° C. for five minutes), the film may have a CIE whiteness index value of about 30 to about 40. That is a reduction in CTF whiteness index value of less than about 20 index points, otherwise understood as a reduction in whiteness of about 30% to about 40%. After UV exposure (using, e.g., a Xenon Arc lamp simulating exposure to daylight, including UV) for 8 hours, the film may have a CIE of about 50 to about 60. That is no reduction in CIE whiteness index value after UV exposure, i.e., less than about 2%, or about 0%. After exposure to $NO_2$ (24 hours), the film may have a CIE whiteness index value of about 48 to about 58, and a reduction in CIE whiteness index value of about 0 to 3 index points. That is a reduction in CIE whiteness value of less than about 5%, or about 0% to about 4%.

In addition, the film formed from a dried aqueous polyurethane dispersion disclosed herein has improved tensile properties over films made from other dispersions. The film may have a tensile strength (when the film is stretched in the sixth cycle) of over about 0.14 g/denier, or over about 0.15 g/denier. The film may have a tensile strength of about 0.14 g/denier to about 0.24 g/denier, or about 0.15 g/denier to about 0.22 g/denier. It was found that higher tensile strengths are possible when the NCO/OH ratio of the prepolymer, or aqueous polyurethane dispersion, is between about 1.50 and about 1.90, with the polymer number average molecular weight larger than 10,000. An NCO/OH ratio lower than about 1.5 produces films that have less or inadequate power (stretch/recovery), and an NCO/OH ratio higher than about 1.9 produces films that are brittle and have reduced elongation (ELO).

In on embodiment, the film formed from a dried aqueous polyurethane dispersion having NCO/OH ratio of about 1.50 to about 1.90, may have a tensile strength of about 0.14 g/denier to about 0.24 g/denier, or about 0.15 g/denier to about 0.22 g/denier. That aqueous polyurethane dispersion may also have a milliequivalent carboxylic acid per kg of prepolymer of about 150 to about 220, about 155 to about 220, or about 180 to about 190.

Accordingly, the disclosed aqueous polyurethane dispersions are useful in the production of shaped articles. The aqueous polyurethane dispersion can be applied to the substrate by various treatment methods including, but not limited to padding, coating, printing, bonding or laminating. Following application, the aqueous polyurethane dispersion is cured (or otherwise dried) to the substrate. Curing may comprise heating the aqueous polyurethane dispersion that has been applied to the substrate to about 150° C. to about 170° C. for about 30 seconds to about 5 minutes.

The aqueous polyurethane dispersion can be used alone or with other aqueous dispersions of a different polymer. Further, the aqueous polyurethane dispersion can be crosslinked with selected crosslinking agents, including, e.g., polycarbodiimides and polyisocyanates.

The aqueous polyurethane dispersion may be diluted to a desired solid content prior to application to the substrate. The substrate to which the aqueous polyurethane dispersion is applied may be a textile fabric or a nonwoven material.

The aqueous polyurethane dispersion can be applied directly to the substrate and/or dried as a film, a tape or in various selected patterns such as, but not limited to, dots, shapes such as triangles, circles, and rectangles, zigzags and/or lines depending upon where stretch and recovery is desired. When applied in zigzags or in non-parallel or discontinuous lines, it is possible to manipulate the directionality or intensity (or both) of the changes in elastic modulus. Additional benefits include improved visual design aesthetic (owing to the shape of the applied patterns as well as the ability to add colorant, reflective, or other additives) and ability to manipulate the fabric drape and tactility. For example, while a solid continuous panel may create maximum increase in modulus, it may feel stiff or papery or noisy when handled. Using interrupted, discontinuous, or broken patterns can alleviate the stiff and papery feel in addition to changing the modulus.

Another embodiment is a method for producing a shaped article comprising applying a aqueous polyurethane dispersion disclosed herein to a substrate. The aqueous polyurethane dispersion may be applied to the substrate by padding, coating, printing, bonding, spraying or laminating. The aqueous polyurethane dispersion may be applied and dried to make a film, tape or selected pattern of dots, shapes, zigzags or lines on all or a part of the substrate where stretch and recovery is desired. The method may further comprise diluting the aqueous polyurethane dispersion prior to application to the substrate or curing the aqueous polyurethane dispersion to the substrate.

Accordingly, the aqueous polyurethane dispersions and methods for their application are particularly useful in production of articles wherein stretch and recovery is desired, in whole or in part. These articles can provide the added effect of body shaping and support while providing comfort. The article may be a garment.

Examples of garments that can be produced using the dispersions and methods falling within the scope of the present disclosure, include but are not limited to: disposable undergarments, brassieres, bralettespanties, lingerie, swimwear, shapers, camisoles, hosiery, sleepwear, aprons, wetsuits, ties, scrubs, space suits, uniforms, hats, garters, sweatbands, belts, activewear, outerwear, rainwear, cold-weather jackets, pants (including denim jeans), skirtings, dresses, blouses, mens and women tops, sweaters, corsets, vests, knickers, socks, knee highs, dresses, blouses, aprons, tuxedos, bisht, abaya, hijab, jilbab, thoub, burka, cape, costumes, diving suit, kilt, kimono, jerseys, gowns, protective clothing, sari, sarong, skirts, spats, stola, suits, straitjacket, toga, tights, towel, uniform, veils, wetsuit, medical compression garments, bandages, suit interlinings, waistbands, and all components therein. In certain embodiments, the garment is a brassiere, a bralette, swimwear (for men or women), shapers or activewear (including leggings, sports bras, shorts and tops).

The aqueous polyurethane dispersion or shaped article may be applied in a predetermined shape and/or to a selected area of a garment. Alternatively, the aqueous polyurethane dispersion or shaped article may be applied into the whole of a garment. The aqueous polyurethane dispersion or shaped article may be applied to a seam or support area of the garment in accordance with the disclosure of U.S. patent application Ser. No. 12/354,030, filed on Jan. 15, 2009, titled: Garment With Altered Stress Profile; U.S. patent application Ser. No. 15/161,749, filed May 23, 2016, titled: Garment With Altered Stress Profile; and U.S. application Ser. No. 15/496,432, filed on the same day herewith (Apr. 25, 2017), titled: Garment Incorporating Aqueous Polyurethane Dispersions Having Altered Stress Profile, both of which are incorporated by reference herein in entirety.

After application of the aqueous polyurethane dispersion or shaped article, the garment may exhibit improved moisture transport, comfort, and lighter weight and feel (e.g., when sew-in panels are eliminated) when compared to conventional garments of the same type that do not incorporate the aqueous polyurethane dispersion or shaped article. In addition, unlike some conventional garments that have extra seams, panels sewn-in or bonded, and/or layers of material to create improved hold, the aqueous polyurethane dispersion or shaped article of the present disclosure may be applied directly to the fabric or material of the garment to create the hold, thereby eliminating the need for extra seams, panels and material.

In the brassiere or bralette (a brassiere without underwire), the aqueous polyurethane dispersion or shaped article may be applied in the lower portion of the cup for support and comfort, in a central portion for modesty, in the side portion for shaping, or any combination thereof.

In an embodiment, the aqueous polyurethane dispersion or shaped article may be applied to swimwear, active wear or shapers in the bust, belly, thighs, seat, or any combination thereof. In another embodiment, the aqueous polyurethane dispersion or shaped article may be applied to active wear or shapers in the calf, arms, chest, bust, belly, thighs, seat, or any combination thereof. It has been found that a small amount of the aqueous polyurethane dispersion selectively placed and applied on garments leads to significant affects and results on the human body) e.g., in terms of shape, comfort and/or support) in those areas to which the aqueous polyurethane dispersion has been applied.

When the aqueous polyurethane dispersion or shaped article is applied to swimwear, the swimwear exhibits improved chlorine resistance. Surprisingly, the improved chlorine resistance of the swimwear is achieved without incorporating additives that are known in the art to improve chlorine resistance, such as a mineral additive being a mixture of huntite and hydromagnesite, as disclosed in U.S. Pat. No. 5,626,960, which is incorporated by reference herein in its entirety. Without being limited to a theory, it is believed that improved chlorine resistance is achieved because the inventive film breaks down and wears away slowly. Additionally, after exposure to a chlorinated environment, the modulus (or fabric retractive force due to elastic properties of the applied dispersion) of the garment where the aqueous polyurethane dispersion or shaped article has been applied remains substantially constant, even after about 30, about 40, about 60, about 100, about 180 or about 200 hours in a chlorinated environment. The chlorinated environment may have a pH of about 7.5, a chlorine concentration of about 3.5 ppm, and a temperature of about 25° C. Substantially constant means that percentage change in the fabric modulus to a 40% stretch is not reduced more than about 15%, or about 10%, after an initial decrease in the first ten hours to the specified time. While the absolute value of the force required to stretch the treated fabric (which also may be referred to as modulus boost or hold) decreases over time, it decreases at approximately the same rate as the underlying fabric. Therefore, the hold remains approximately constant.

After 220 hours in a chlorinated environment, the hold (or gram-force of the fabric strength) was surprisingly shown to decrease at a rate equal to that of the chlorine resistant protected spandex in the underlying fabric. This occurs despite the fact that the aqueous polyurethane dispersion does not contain any additives known to the industry to protect segmented polyurethanes, such as spandex. Of course, it is known to one of ordinary skill in the art that chlorine resistance may be otherwise enhanced by adding known additives that impart said property.

It is understood that the swimwear discussed in relation to improved chlorine resistance is made from fabric that is of good quality and remains intact after 220 hours in a chlorinated environment.

EXAMPLES

Representative embodiments of the present disclosure will be described with reference to the following examples that illustrate the principles and practice of the present disclosure. In no way is the scope of the disclosure limited to these representative embodiments. In these examples, the following raw materials were used:

TABLE 1

| Ingredient | Chemical Name | CAS # | Tradename | Vendor |
| --- | --- | --- | --- | --- |
| Glycol | PTMEG | 25190-06-1 | Terathane ® 1800 | INVISTA |
| Isocyanate | Dicyclohexyl-methane diisocyanate | 5124-30-1 | Vestanate H12MDI | Evonik |
| DMPA | Dimethylolpropionic Acid | 4767-03-7 | Bis-MPA | GEO |
| Neutralizer | Triethylamine | 121-44-8 | TEA | BASF |
| Surfactant | Alkyldiphenyl-oxide Disulfonate | 119345-04-9 | Dowfax 2A1 | Dow |
| Defoamer | mineral oil, silicone oil | 3173-53-3 | BYK 012 | BYK Additives & Instruments |
| Antioxidant | hindered phenols | 36443-68-2 | Irganox 245 | BASF |
| Thickener | polyurethane | mixture | Tafigel PUR 61 | Munzing |

The following analytical methods were used in the Examples below where noted: 1) Titration methods; 2) Microwave methods; 3) Brookfield Viscosity, RV Spindle methods #3/10 rpm @25° C.

The titration method used for determining the percent isocyanate (% NCO) of the capped glycol prepolymer was carried out according to the method of S. Siggia, "Quantitative Organic Analysis via Functional Group," 3rd Ed., Wiley & Sons, New York, pages 559-561 (1963), using a potentiometric titration. The dispersion solid concentration was determined by a microwave solids analyzer LABWAVE 9000. The dispersion viscosity was determined with a Brookfield Viscometer.

Example 1: Prepolymer Preparation without 1-Hexanol

A polyurethane prepolymer was made using a polytetramethylene ether glycol, an aliphatic diisocyanate such as PICM (4,4'-methylene bis (cyclohexyl isocyanate), a hydrogenated version of 4,4'-MDI) and a diol containing a sterically hindered carboxylic acid group. More specifically, the following ingredients and unit quantities were used to make the prepolymer:

TABLE 2

| Ingredient | CAS Number | Unit Quantity |
| --- | --- | --- |
| Terathane* 1800 | 251090-06-1 | 72.7806 |
| 1-Hexanol | 111-27-3 | 0.0000 |
| Vestanat* H12MDI | 5124-30-1 | 24.7380 |
| DMPA | 4767-03-7 | 2.4814 |
| Prepolymer total | | 100.0000 |

The reaction to prepare the prepolymer was carried out in a moisture-free, nitrogen-blanketed atmosphere to avoid side reactions.

In this example, a 30 gallon reactor, jacketed with hot water and equipped with an agitator, was used. This reactor was heated to a temperature of about 55° C. A pre-determined weight of molten Terathane® 1800 glycol was charged into the reactor. Then, DMPA solid powder was added to the reactor with agitation and circulation, under nitrogen blanket, until the DMPA solid particles were dispersed and dissolved in glycol.

Molten PICM was then charged into the reactor with continuous agitation and the capping reaction was allowed to take place at 90° C. for 240 minutes, still with continuous agitation. The formed viscous prepolymer was then sampled to determine the extent of the reaction by measuring the weight percentage of the isocyanate groups (% NCO) of the prepolymer through a titration method. The theoretical value of the % NCO after the reaction is completed is 2.97 assuming the glycol MW is at 1800. If the determined % NCO value is higher than the theoretical value, the reaction should be allowed to continue until the theoretical value is reached or the % NCO number becomes constant. Once it was determined that the reaction is complete, the prepolymer temperature was maintained between 85 and 90° C.

Example 2: Preparation of Aqueous Polyurethane Dispersion with Prepolymer of Example 1

The aqueous polyurethane dispersion was prepared by the addition of the prepolymer of Example 1 using a rotor/stator high speed disperser. The prepolymer as made in Example 1 was transferred directly into the disperser head and dispersed under high shear forces into deionized water, containing a surfactant, a neutralizer, an anti-oxidant and a foam control agent. Slightly more prepolymer than required by the dispersion recipe was needed to compensate for loss in the transfer line and in the reactor.

The ingredients for making the dispersion and the composition of the aqueous polyurethane dispersion are shown below in Table 3.

TABLE 3

| Ingredient | CAS Number | Unit Quantity |
|---|---|---|
| Terathane* 1800 | 251090-06-1 | 30.1391 |
| Vestanat* H12MDI | 5124-30-1 | 10.2442 |
| DMPA | 4767-03-7 | 1.0276 |
| 1-Hexanol | 111-27-3 | 0.0000 |
| DI Water | 7732-18-5 | 54.8093 |
| Dowfax 2A1 | 119345-04-9 | 1.2652 |
| Triethylamine | 121-44-8 | 0.7830 |
| Irganox 245 | 36443-68-2 | 0.6051 |
| Tafigel PUR 61 | Mixture | 1.0000 |
| BYK 012 | Mixture | 0.1265 |
| Other | | 0.0000 |
| Total | | 100.0000 |

In making a typical batch of 100 kg of the aqueous polyurethane dispersion, Dowfax 2A1 surfactant (1.2652 kg), an anti-oxidizer Irganox 245 (0.6051 kg), and foam control agent BYK-012 (0.1265 kg) were mixed and dissolved in the deionized water (54.8093 kg). The triethylamine neutralizer (0.783 kg) was added to the above water mixture 5 minutes prior to the addition of the prepolymer. The prepolymer (41.4109 kg) maintained at a temperature between 85 and 90° C. was added into the water mixture with high speed dispersing. The addition rate (typically at about 1.5 kg/min or about 30 minutes) of the prepolymer should be controlled to allow the formation of uniform dispersion, and the temperature of the dispersion should be kept between 40 and 45° C. Once the addition of prepolymer was complete, mixing was continued for 60 minutes. Then, a thickener Tafigel PUR 61 (1.00 kg) was added and allowed to mix for another 60 minutes. The as-made dispersion was continuously agitated at low speed for 8 hours (or overnight) in the container to eliminate foams and to ensure the reaction had reached completion. The finished dispersion typically contains about 42% solids, with viscosity about 4000 centipoises and pH in the range of 7.0 to 8.5.

The dispersion was then filtered through 100 micron bag filters to remove big particles before packed for shipment. It is recommended to use 55 gallon metal drums with polyethylene liner inside to contain the dispersion for shipment.

Final product specifications were determined as shown in Table 4,

TABLE 4

| Parameters | Aim | ±Limits | Method |
|---|---|---|---|
| Prepolymer % NCO* | 3.00 | 0.10 | Titration |
| Dispersion Solids, % | 44.0 | 2.0 | Microwave |
| Dispersion Viscosity, cps** | 4000 | 1000 | RV Spindle #3/10 rpm@25° C. |
| Dispersion pH | 7.7 | 0.7 | |
| Dispersion Filterability | | Passing through filter bags no more than 100 microns | |

*Sampled 20-30 minutes before the prepolymer is dispersed.
**Sampled and measured 24 hours after the dispersion is thickened.

Example 3: Preparation of Prepolymer with 1-Hexanol

The polyurethane prepolymer was made using a polytetramethylene ether glycol, 1-Hexanol, an aliphatic diisocyanate such as PICM (4,4'-methylene his (cyclohexyl isocyanate), a hydrogenated version of 4,4'-MDI) and a diol containing a sterically hindered carboxylic acid group. Table 5 lists the ingredients and unit quantities used to make the prepolymer.

TABLE 5

| Ingredient | CAS Number | Unit Quantity |
|---|---|---|
| Terathane* 1800 | 251090-06-1 | 72.4492 |
| 1-Hexanol | 111-27-3 | 0.4087 |
| Vestanat* H12MDI | 5124-30-1 | 24.6607 |
| DMPA | 4767-03-7 | 2.4814 |
| Prepolymer total | | 100.0000 |

The reaction to prepare the prepolymer was carried out in a moisture-free, nitrogen-blanketed atmosphere to avoid side reactions.

In this example, a 30 gallon reactor, jacketed with hot water and equipped with an agitator, was used. This reactor was heated to a temperature of about 55° C. A pre-determined weight of molten Terathane® 1800 glycol was charged into the reactor. The 1-Hexanol was added second. Then, DMPA solid powder was added to the reactor with agitation and circulation, under nitrogen blanket, until the DMPA solid particles were dispersed and dissolved in glycol.

Molten PICM was then charged into the reactor with continuous agitation and the capping reaction was allowed to take place at 90° C. for 240 minutes, still with continuous agitation. The formed viscous prepolymer was then sampled to determine the extent of the reaction by measuring the weight percentage of the isocyanate groups (% NCO) of the prepolymer through a titration method. The theoretical value of the % NCO after the reaction is completed is 2.80 assuming the glycol MW is at 1800. If the determined % NCO value is higher than the theoretical value, the reaction should be allowed to continue until the theoretical value is reached or the % NCO number becomes constant. Once it was determined that the reaction is complete, maintain the prepolymer temperature between 85 and 90° C.

Example 4: Preparation of Aqueous Polyurethane Dispersion with Prepolymer of Example 3

The aqueous polyurethane dispersion was prepared by the addition of prepolymer of Example 3 using a rotor/stator high speed disperser. The prepolymer as made in Example 3 was transferred directly into the disperser head and dispersed under high shear forces into deionized water, containing a surfactant, a neutralizer, an anti-oxidant and a foam control agent. Slightly more prepolymer than required by the dispersion recipe is needed to compensate for loss in the transfer line and in the reactor.

Table 6 lists the ingredients used in making the aqueous polyurethane dispersion and the composition of the aqueous polyurethane dispersion.

TABLE 6

| Ingredient | CAS Number | Unit Quantity |
|---|---|---|
| Terathane* 1800 | 251090-06-1 | 30.0000 |
| Vestanat* H12MDI | 5124-30-1 | 10.2116 |
| DMPA | 4767-03-7 | 1.0275 |
| 1-Hexanol | 111-27-3 | 0.1692 |
| DI Water | 7732-18-5 | 54.8083 |
| Dowfax 2A1 | 119345-04-9 | 1.2652 |
| Triethylamine | 121-44-8 | 0.7866 |
| Irganox 245 | 36443-68-2 | 0.6051 |
| Tafigel PUR 61 | Mixture | 1.0000 |
| BYK 012 | Mixture | 0.1265 |
| Other | | 0.0000 |
| Total | | 100.0000 |

In making a typical batch of this 100 kg dispersion Dowfax 2A1 surfactant (1.2652 kg), an anti-oxidizer Irganox 245 (0.6051 kg), and foam control agent BYK-012 (0.1265 kg) were mixed and dissolved in the deionized water (54.8083 kg). The triethylamine neutralizer (0.7866 kg) was added to the above water mixture 5 minutes prior to the addition of the prepolymer. The prepolymer (41.4083 kg) maintained at a temperature between 85 and 90° C. was added into the water mixture with high speed dispersing. The addition rate (typically at about 1.5 kg/min or about 30 minutes) of the prepolymer should be controlled to allow the formation of uniform dispersion, and the temperature of the dispersion should be kept between 40 and 45° C. Once the addition of prepolymer was complete, mixing was continued for 60 minutes. Then, a thickener Tafigel PUR 61 (1.00 kg) was added and allowed to mix for another 60 minutes. The as-made dispersion was continuously agitated at low speed for 8 hours (or overnight) in the container to eliminate foams and to ensure the reaction had reached completion. The finished dispersion typically contains about 42% solids, with viscosity about 4000 centipoises and pH in the range of 7.0 to 8.5.

The dispersion is then filtered through 100 micron bag filters to remove big particles before packed for shipment. It is recommended to use 55 gallon metal drums with vented caps, and with a polyethylene liner inside to contain the dispersion for shipment.

Final product specifications were determined as shown in Table 7.

TABLE 7

| Parameters | Aim | ±Limits | Method |
|---|---|---|---|
| Prepolymer % NCO* | 2.80 | 0.10 | Titration |
| Dispersion Solids, % | 44.0 | 2.0 | Microwave |
| Dispersion Viscosity, cps** | 4000 | 1000 | RV Spindle #3/ 10 rpm@25° C. |
| Dispersion pH | 7.7 | 0.7 | |
| Dispersion Filterability | Passing through filter bags no more than 100 microns | | |

*Sampled 20-30 minutes before the prepolymer is dispersed.
**Sampled and measured 24 hours after the dispersion is thickened.

Example 5: Comparison of Whiteness Retention

An experiment was conducted to compare the whiteness retention (or "non-yellowing") of aqueous polyurethane dispersions of the disclosure with other dispersions. For each dispersion, a sample was prepared by casting a film on a Mylar sheet with a 10 mil knife and then dried in a nitrogen box. The film samples were exposed to different conditions and whiteness CIE data was collected after each exposure period. The exposure conditions were thermal (195° C. for five minutes), UV (8 hours), fume (24 hours) and $NO_2$ (24 hours). The thermal exposure test was conducted in a thermal chamber (Werner-Mathis AG, Typ-Nr., LTF 117187) in heated air. The UV exposure test was conducted in Atlas Weather-Ometer® equipped with an Xenon Arc lamp simulating the exposure to daylight, including UV. The $NO_2$ exposure test was conducted in Atlas Weather-Ometer® in nitrogen oxides atmosphere. For each sample, the color of the film before and after exposure was compared; the lower the reduction in CIE, the better the whiteness retention.

Aqueous polyurethane dispersions, i.e., Examples 50-59, were prepared according to the compositional makeups shown in Tables 8 and 9.

TABLE 8

| Part Number | Ex. 50 (D71206) | Ex. 51 (D71207) | Ex. 52 (D80102) | Ex. 53 (D80110) | Ex. 54 (D80111) |
|---|---|---|---|---|---|
| NCO/OH Ratio | 1.3726 | 1.3726 | 1.5300 | 1.3726 | 1.3700 |
| Meq Acid/kg CG | 184.5 | 183.6 | 220.0 | 183.6 | 185.0 |
| Meq Monol/kg | | | | | |
| CG | 0.00 | 48.20 | 40.00 | 48.20 | 40.00 |
| Mw | | 49450 | 48400 | | 46300 |

TABLE 8-continued

| Part Number | Ex. 50 (D71206) | Ex. 51 (D71207) | Ex. 52 (D80102) | Ex. 53 (D80110) | Ex. 54 (D80111) |
|---|---|---|---|---|---|
| Mn | | | 18050 | 15600 | 16600 |
| Prepolymer: | | | | | |
| Capped Glycol Recipe, Batch Wt, g | 1010.16 | 1200 | 1200 | 1200 | 1200 |
| T-1800 Glycol, g | 765.00 | 904.29 | 861.59 | 904.29 | 904.85 |
| PICM, g | 220.16 | 260.25 | 298.10 | 260.25 | 260.47 |
| DMPA, g | 25.00 | 29.55 | 35.41 | 29.55 | 29.78 |
| Hexanol, g | 0.00 | 5.91 | 4.90 | 5.91 | 4.90 |
| Capping Temp., °C. | 90 | 90 | 90 | 90 | 90 |
| Capping Time, min | 120 | 120 | 180 | 180 | 180 |
| FBV Measured | 1175 | 1070 | 1040 | 1787 | 1632 |
| Dispersion Recipe | | | | | |
| Capped glycol dispersed, g | 575.00 | 701.00 | 681.00 | 693.00 | 704.00 |
| DI Water, g | 1000.00 | 1000.00 | 1000.00 | 1000.00 | 1000.00 |
| Nacconol 90G, g | 20.00 | 20.00 | 20.00 | 20.00 | 20.00 |
| TEA, g | 12.67 | 12.67 | 12.67 | 12.67 | 12.67 |
| DeFoo 3000, g | 1.00 | 1.00 | 1.00 | 1.00 | 1.00 |
| Silicone 65, g | 5.00 | 5.00 | 5.00 | 5.00 | 5.00 |
| Other, g | 0.00 | 0.00 | 0.00 | 0.00 | 0.00 |
| Acrysol RM-8W, g | 35.00 | 35.00 | 35.00 | 35.00 | 35.00 |
| Irganox 245, g | 10.70 | 10.70 | 10.70 | 10.70 | 10.70 |
| Total Weight, g | 1659.37 | 1785.37 | 1765.37 | 1777.37 | 1788.37 |

TABLE 9

| Part Number | Ex. 55 (D0118) | Ex. 56 (D80125) | Ex. 57 (D80129) | Ex. 58 (D80208) | Ex.59 (D80212) |
|---|---|---|---|---|---|
| NCO/OH Ratio | 1.3700 | 1.5300 | 1.5300 | 1.5300 | 1.3700 |
| Meq Acid/kg CG | 185.0 | 185.0 | 185.0 | 220.0 | 155.0 |
| Meq Monol/kg | | | | | |
| CG | 50.00 | 40.00 | 50.00 | 50.00 | 30.00 |
| Mw | 51000 | 50200 | 41700 | | |
| Mn | 16400 | 19000 | 15600 | | |
| Prepolymer: | | | | | |
| Capped Glycol Recipe, Batch Wt, g | 1200 | 1200 | 1200 | 1200 | 1200 |
| T-1800 Glycol, g | 903.83 | 879.98 | 878.97 | 860.58 | 920.68 |
| PICM, g | 260.27 | 285.34 | 285.12 | 297.88 | 250.69 |
| DMPA, g | 29.78 | 29.78 | 29.78 | 35.41 | 24.95 |
| Hexanol, g | 6.13 | 4.90 | 6.13 | 6.13 | 3.68 |
| Capping Temp., °C. | 90 | 90 | 90 | 90 | 90 |
| Capping Time, min | 180 | 180 | 180 | 180 | 180 |
| FBV Measured | 1441 | 1073 | 1271 | 1171 | 1478 |
| Dispersion Recipe | | | | | |
| Capped glycol dispersed, g | 700.00 | 735.00 | 707.00 | 699.00 | 689.00 |
| DI Water, g | 1000.00 | 1000.00 | 1000.00 | 1000.00 | 1000.00 |
| Nacconol 90G, g | 20.00 | 20.00 | 20.00 | 20.00 | 20.00 |
| TEA, g | 12.67 | 12.67 | 12.67 | 12.67 | 12.67 |
| DeFoo 3000, g | 1.00 | 1.00 | 1.00 | 1.00 | 1.00 |
| Silicone 65, g | 5.00 | 5.00 | 5.00 | 5.00 | 5.00 |
| Other, g | 0.00 | 0.00 | 0.00 | 0.00 | 0.00 |
| Acrysol RM-8W, g | 35.00 | 35.00 | 35.00 | 35.00 | 35.00 |
| Irganox 245, g | 10.70 | 10.70 | 10.70 | 10.70 | 10.70 |
| Total Weight, g | 1784.37 | 1819.37 | 1791.37 | 1783.37 | 1773.37 |

Comparative dispersions, F-70 and F-120, were also made according to the compositional makeups shown in Tables 10 through 13.

TABLE 10

F-70 Prepolymer Composition

| Ingredient | CAS Number | Unit Quantity |
|---|---|---|
| Terathane* 1800 | 251090-06-1 | 76.1886 |
| 1-Hexanol | 111-27-3 | 0.4070 |
| Mondur* ML | 26447-40-5 | 20.9145 |
| DMPA | 4767-03-7 | 2.4898 |
| | | 100.0000 |

TABLE 11

F-70 Dispersion Composition

| Ingredient | CAS Number | Unit Quantity |
|---|---|---|
| Terathane* 1800 | 251090-06-1 | 29.9387 |
| Mondur* ML | 26447-40-5 | 8.2185 |
| DMPA | 4767-03-7 | 0.9784 |
| DI Water | 7732-18-5 | 56.8384 |
| Nacconol 90G | 25155-30-0 | 1.1510 |
| Triethylamine | 121-44-8 | 0.7482 |
| 1-Hexanol | 111-27-3 | 0.1606 |
| Additive 65 (Dow) | mixture | 0.2896 |
| DeFoo 3000 | mixture | 0.0609 |
| Acrysol RM-8W | mixture | 1.0000 |
| Irganox 245 | 36443-68-2 | 0.6157 |
| TOTAL | | 100.0000 |

Note:
The amount of Acrysol RM-8W may be adjusted to achieve desired dispersion viscosity aim.

TABLE 12

F-120 Prepolymer Composition

| Ingredient | CAS Number | Unit Quantity |
|---|---|---|
| Terathane* 1800 | 251090-06-1 | 76.5000 |
| 1-Hexanol | 111-27-3 | 0.0000 |

TABLE 12-continued

F-120 Prepolymer Composition

| Ingredient | CAS Number | Unit Quantity |
|---|---|---|
| Mondur* ML | 26447-40-5 | 21.0000 |
| DMPA | 4767-03-7 | 2.5000 |
| | | 100.0000 |

TABLE 13

F-120 Dispersion Composition

| Ingredient | CAS Number | Unit Quantity |
|---|---|---|
| Terathane* 1800 | 251090-06-1 | 29.9387 |
| Mondur* ML | 26447-40-5 | 8.2185 |
| DMPA | 4767-03-7 | 0.9784 |
| DI Water | 7732-18-5 | 56.9990 |
| Nacconol 90G | 25155-30-0 | 1.1510 |
| Triethylamine | 121-44-8 | 0.7482 |
| 1-Hexanol | 111-27-3 | 0.0000 |
| Additive 65 (Dow) | mixture | 0.2896 |
| DeFoo 3000 | mixture | 0.0609 |
| Acrysol RM-8W | mixture | 1.0000 |
| Irganox 245 | 36443-68-2 | 0.6157 |
| TOTAL | | 100.0000 |

Note:
The amount of Acrysol RM-8W may be adjusted to achieve desired dispersion viscosity aim.

The product specifications for these comparative dispersions (F-10 and F-120) are included in Table 14.

TABLE 14

| Parameters | Aim | ±Limits |
|---|---|---|
| Prepolymer % NCO | 1.91 | 0.25 |
| Dispersion Solids, % | 40.0 | 1.0 |
| Dispersion Viscosity, cps | 3000 | 500 |
| Dispersion pH | 7.7 | 0.7 |
| Dispersion Filterability | grits large than 400 microns below 2.5 wt % of the total solids | |

The difference in CIE whiteness index values before and after exposure (i.e., the results of whiteness retention) are shown in Tables 15 (thermal), 16 (UV) and 17 (fume).

TABLE 15

| Sample Part | As Is CIE avg | Thermal 1 Min | Thermal 2 Min | Thermal 3 Min | Thermal 4 Min | Thermal 5 Min | Thermal Delta |
|---|---|---|---|---|---|---|---|
| Bemis 3410 | 53.28 | 58.53 | 57.68 | 58.01 | 57.47 | 57.27 | 3.99 |
| LYCRA ® T162C | 52.87 | 56.85 | 55.57 | 55.89 | 54.97 | 55.04 | 2.17 |
| LYCRA ® T162C | 53.01 | | | | | | |
| F-120 | 49.21 | 46.83 | 42.03 | 37.01 | 30.27 | 23.81 | −25.40 |
| F-70 | 41.26 | 38.31 | 31.97 | 23.25 | 14.61 | 6.12 | −35.14 |
| Ex. 52 (D80102) | 55.29 | 56.13 | 52.49 | 47.59 | 43.11 | 37.74 | −17.56 |
| Ex. 53 (D80110) | 52.25 | 55.85 | 52.45 | 46.41 | 40.11 | 35.68 | −16.57 |
| Ex. 54 (D80111) | 53.35 | | | | | | |
| Ex. 55 (D80118) | 52.98 | | | | | | |
| Ex. 56 (D80125) | 55.71 | 56.55 | 52.71 | 49.47 | 43.57 | 37.03 | −18.68 |
| Ex. 57 (D80129) | 56.38 | 56.44 | 52.84 | 47.95 | 43.51 | 36.46 | −19.92 |
| Ex. 58 (D80208) | 56.88 | 55.35 | 51.35 | 46.77 | 41.94 | 37.36 | 49.52 |
| Ex. 59 (D80212) | 51.56 | | | | | | |
| Mylar control | 54.81 | 56.99 | 58.47 | 58.04 | 57.51 | 57.26 | 2.45 |

TABLE 16

| Sample Part | UV 2 Hr | UV 4 Hr | UV 8 Hr | UV Delta |
|---|---|---|---|---|
| Bemis 3410 | 58.18 | 57.44 | 57.81 | 4.53 |
| LYCRA ® T162C | 57.86 | 57.86 | 57.58 | 4.71 |
| LYCRA ® T162C | 57.86 | 57.86 | 58.42 | 5.41 |
| F-120 | 33.08 | 25.66 | 18.87 | −30.34 |
| F-70 | 34.14 | 34.14 | 29.29 | −11.97 |
| Ex. 52 (D80102) | 54.45 | 54.92 | 55.85 | 0.55 |
| Ex. 53 (D80110) | 57.25 | 57.31 | 58.49 | 6.25 |
| Ex. 54 (D80111) | | | | |
| Ex. 55 (D80118) | | | | |
| Ex. 56 (D80125) | 55.11 | 55.15 | 56.22 | 0.51 |
| Ex. 57 (D80129) | | | | |
| Ex. 58 (D80208) | 54.19 | 54.19 | 55.62 | −1.26 |
| Ex. 59 (D80212) | 55.21 | 55.21 | 55.24 | 3.68 |
| Mylar control | 58.64 | 59.27 | 59.93 | 5.12 |

TABLE 17

| Sample Part | NO2 8 Hr | NO2 16 Hr | NO2 24 Hr | NO2 Delta | Fume 8 Hr | Fume 16 Hr | Fume 24 Hr | Fume Delta |
|---|---|---|---|---|---|---|---|---|
| Bemis 3410 | 58.74 | 58.40 | 53.67 | 0.39 | | | | |
| LYCRA T162C | 58.54 | 59.01 | 51.00 | −2.01 | | | | |
| LYCRA T162C | | | | | | | | |
| F-120 | 32.68 | 21.38 | 5.85 | −35.41 | | | | |
| F-70 | | | | | | | | |
| Ex. 52 (D80102) | | | | | | | | |
| Ex. 53 (D80110) | | | | | | | | |
| Ex. 54 (D80111) | 57.71 | 57.71 | 51.21 | −2.14 | 51.76 | 54.47 | 52.92 | −0.43 |
| Ex. 55 (D80118) | 57.94 | 56.88 | 55.08 | 2.11 | 53.23 | 52.16 | 49.12 | −3.86 |
| Ex. 56 (D80125) | 56.15 | 55.77 | 55.38 | −0.33 | | | | |
| Ex. 57 (D80129) | 56.46 | 55.81 | 56.2 | −0.18 | 53.62 | 51.99 | 48.85 | −7.53 |
| Ex. 58 (D80208) | | | | | 53.67 | 52.47 | 49.99 | −6.89 |
| Ex. 59 (D80212) | 57.69 | 58.11 | 56.93 | 5.37 | | | | |
| Mylar control | 57.30 | 59.43 | 59.06 | 4.25 | 59.58 | 59.10 | 58.70 | 3.89 |

Figure 2:
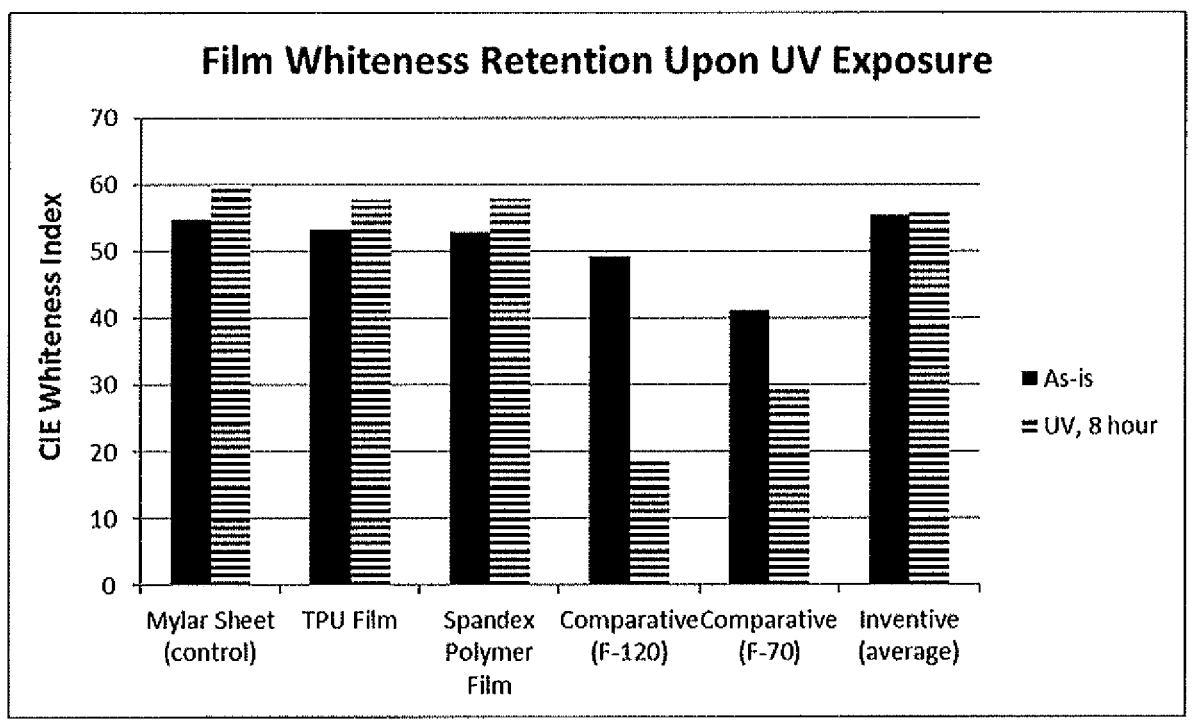
FIG. 2 is a bar graph depicting film whiteness retention for six film samples after UV exposure.
Figure 3:
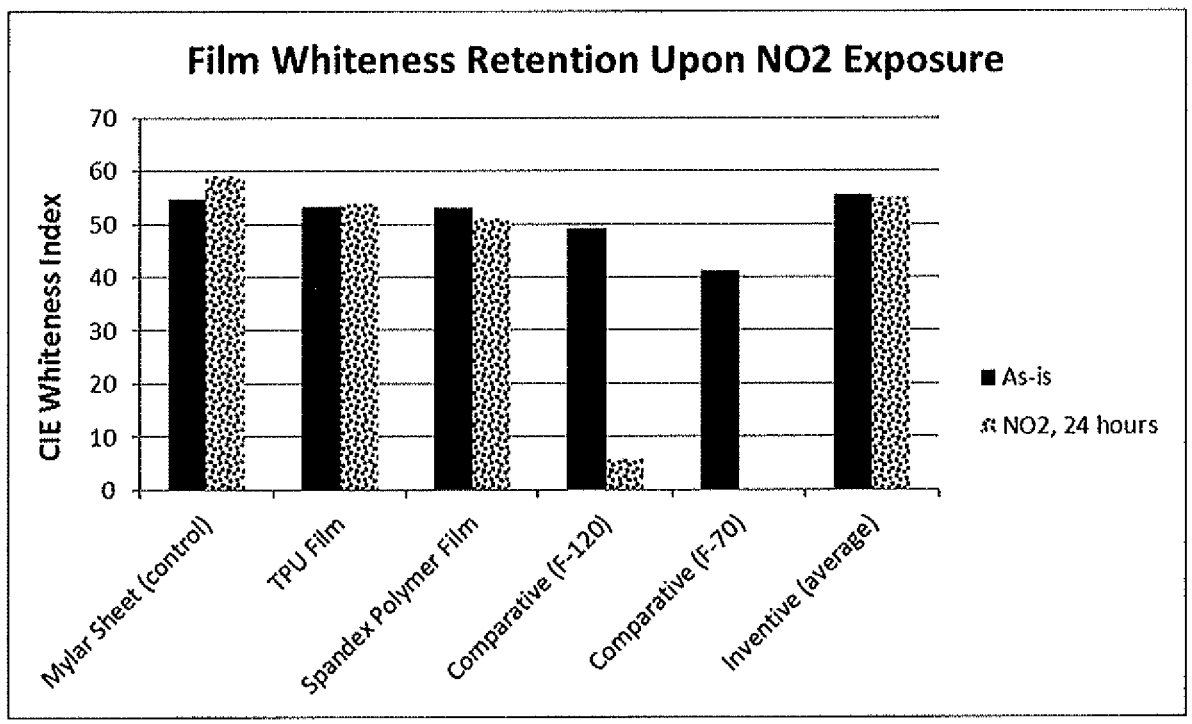
FIG. 3 is a bar graph depicting film whiteness retention for six film samples after $NO_2$ exposure.

The results of the whiteness retention test are graphically depicted in FIGS. 1 through 3. "Inventive (average)" is an average of Examples 50-59. For comparison, TPU Film, which is a commercially extruded film (Bemis 3410), mid a conventional commercially available Spandex Polymer Film (LYCRA® T162C) is included, as well as the results of samples prepared using comparative formulas F-70 and F-120, which were films cast from polyurethane dispersions with aromatic diisocyanates.

The films made from dispersions of the present disclosure (Inventive (average)) showed better whiteness retention than films of F-70 and F-120, especially after UV and $NO_2$ exposures. This is expected to be due to inclusion of an aliphatic diisocyanate (i.e., PICM) in the compositions of the present disclosure, as opposed to an aromatic isocyanate (i.e., Mondur® ML) in F-70 and F-120.

Film properties are included in Tables 18 and 19.

TABLE 18

| Sample Part | NCO/OH Ratio* | Meq Acid/kg CG | Meq Monol/kg CG | TP1 (g/den) | TP2 (g/den) | TP301 (g/den) | TP3 (g/den) | DEC (%) |
|---|---|---|---|---|---|---|---|---|
| Ex. 54 (D80111) | 1.3700 | 185.0 | 40.00 | 0.0062 | 0.0064 | 0.0066 | 0.0033 | 33.46 |
| Ex. 52 (D80102) | 1.5300 | 220.0 | 40.00 | 0.0133 | 0.0163 | 0.0195 | 0.0097 | 20.28 |
| Ex. 55 (D80118) | 1.3700 | 185.0 | 50.00 | 0.0062 | 0.0062 | 0.0062 | 0.0028 | 38.82 |
| Ex. 57 (D80129) | 1.5300 | 185.0 | 50.00 | 0.0107 | 0.0123 | 0.0139 | 0.0078 | 24.79 |
| Ex. 56 (D80125) | 1.5300 | 185.0 | 40.00 | 0.0108 | 0.0137 | 0.0166 | 0.0095 | 24.52 |
| Ex. 58 (D80208) | 1.5300 | 220.0 | 50.00 | 0.0109 | 0.0131 | 0.0154 | 0.0086 | 25.30 |
| Ex. 59 (D80212) | 1.3700 | 155.0 | 30.00 | 0.0049 | 0.0055 | 0.0059 | 0.0021 | 39.68 |
| F-120 | 1.373 | 184.5 | 0.00 | 0.0193 | 0.0256 | 0.0358 | 0.0223 | 11.11 |
| F-70 | 1.370 | 185.0 | 40.00 | 0.0137 | 0.0173 | 0.0220 | 0.0112 | 13.01 |

*Excluding OH from monol terminator.

TABLE 19

| Sample Part | TM2 (g/den) | TM1 (g/den) | ELO (%) | TEN (g/den) | SET (%) |
|---|---|---|---|---|---|
| Ex. 54 (D80111) | 0.0008 | 0.0000 | 1000.00 | 0.0098 | 98.35 |
| Ex. 52 (D80102) | 0.0034 | 0.0001 | 620.02 | 0.0330 | 88.10 |
| Ex. 55 (D80118) | 0.0004 | 0.0000 | 187.76 | 0.0062 | 80.71 |
| Ex. 57 (D80129) | 0.0028 | 0.0000 | 854.44 | 0.0499 | 154.25 |
| Ex. 56 (D80125) | 0.0033 | 0.0004 | 699.11 | 0.0469 | 256.71 |
| Ex. 58 (D80208) | 0.0029 | 0.0000 | 733.00 | 0.0384 | 113.54 |
| Ex. 59 (D80212) | 0.0003 | 0.0000 | 999.44 | 0.0064 | 129.57 |
| F-120 | 0.0104 | 0.0062 | 618.78 | 0.1332 | 26.64 |
| E-70 | 0.0045 | 0.0016 | 586.56 | 0.0281 | 46.81 |

The abbreviations used in Tables 18 and 19 have the following meanings:

Meq is the milliequivalent of the specific functional groups, such as carboxylic acid or hydroxyl terminating groups. For dispersions of the present disclosure, they are expressed as milliequivalent per kg of the prepolymer or capped glycol (CG).

TP1, TP2, TP301, TP3 represent the load power. This is the force when a film sample is stretched to a certain percentage in a specific stretch (0-300%) cycle. TP1 means that the film is stretched to 100%. TP2 means the stretch force (also called load power) that the film is stretched to 200% in the first 0 to 300% stretch cycles. TP301 means that the film is stretched to 300% in the first stretch cycle. TP3 means that the film is stretched to 300% in the fifth stretch cycle.

DEC is a stress decay measurement. When the film sample is stretched for the $5^{th}$ time to 300% elongation, this determines the force (5TP300). When the sample is held at this elongation for 30 seconds, the force will drop due to stress relaxation. The force data collected after holding for 30 seconds, right before releasing the tension for recovery, is 5TM300.

DEC=(5TP300−5TM300)×100/5TP300

TM2 is the recovery force (also called unload power) of the film sample measured at 200% elongation in the $5^{th}$ 0 to 300% stretch cycle.

TM1 is the recovery force or unload power of the film sample after DEC measurement, measured at 100% elongation in the $5^{th}$ stretch cycle.

ELO is the break elongation when the film sample is stretched in the sixth cycle.

TEN is the tensile strength or tenacity when the film sample is stretched in the sixth cycle, SET is the unrecovered set after 5 stretch cycles when the recovery force of the film sample reaches to zero.

Because the film samples had different thicknesses, the force data was normalized in terms of grams per denier.

Example 6: Comparison of Tensile Strength

An experiment was conducted to improve the tensile strength of films made from aqueous polyurethane dispersions of the disclosure and compare them with comparative examples, F-70 and F-120.

As shown in Table 20 (which reconfigures data presented in Tables 18 and 19 above), under the same compositional control parameters, films made from F-70 and F-120 had better balanced tensile properties (higher load and unload power, higher tenacity) than films of the present disclosure.

TABLE 20

| Sample Part | NCO/OH Ratio | Meq Acid/kg CG | Meq Monol/kg CG | TP2 (g/den) | DEC (%) | TM2 (g/den) | TEN (g/den) | SET (%) |
|---|---|---|---|---|---|---|---|---|
| Ex. 54 | 1.3700 | 185.0 | 40.00 | 0.0064 | 33.46 | 0.0008 | 0.0098 | 98.35 |
| Ex. 55 | 1.3700 | 185.0 | 50.00 | 0.0062 | 38.82 | 0.0004 | 0.0062 | 80.71 |
| Ex. 59 | 1.3700 | 155.0 | 30.00 | 0.0055 | 39.68 | 0.0003 | 0.0064 | 129.57 |
| F-120 | 1.373 | 184.5 | 0.00 | 0.0256 | 11.11 | 0.0104 | 0.1332 | 26.64 |
| F-70 | 1.370 | 185.0 | 40.00 | 0.0173 | 13.01 | 0.0045 | 0.0281 | 46.81 |

New samples as shown in Table 21 were prepared modifying the NCO/OH ratio and amount of monol terminator (Meq Monol/kg CG). After testing the tensile strength of these new samples (Examples 60-65), it was found that the tensile performance improved with an increase in NCO/OH ratio over 1.370 and/or reduced terminator (Meq Monol/kg CG).

TABLE 21

| Part Number | Ex. 60 (D160317) | Ex. 61 (D160318) | Ex. 62 (D160322) | Ex. 63 (D160318-2) | Ex. 64 (D160329) | Ex. 65 (D160331) |
|---|---|---|---|---|---|---|
| NCO/OH Ratio | 1.6000 | 1.5000 | 1.8000 | 1.5000 | 1.9000 | 2.0000 |
| % NCO Aim | 2.9717 | 2.5060 | 3.8707 | 2.5060 | 4.3049 | 4.7292 |
| Meg Acid/kg CG | 185.0 | 185.0 | 185.0 | 185.0 | 185.0 | 185.0 |
| Meq Monol/kg CG | 0.00 | 0.00 | 0.00 | 0.00 | 0.00 | 0.00 |
| pH | pH-6.56 | pH-6.60 | pH-6.95 | pH-7.50 | pH-6.72 | pH-6.76 |
| Prepolymer: | | | | | | |
| Capped Glycol Recipe, Batch Wt, g | 1200 | 1200 | 1200 | 1200 | 1200 | 1200 |
| T-1800 Glycol, g | 873.37 | 888.59 | 843.97 | 888.59 | 829.78 | 815.90 |
| PICM, g | 296.86 | 281.63 | 326.25 | 281.63 | 340.45 | 354.32 |
| DMPA, g | 29.78 | 29.78 | 29.78 | 29.78 | 29.78 | 29.78 |

TABLE 21-continued

| Part Number | Ex. 60 (D160317) | Ex. 61 (D160318) | Ex. 62 (D160322) | Ex. 63 (D160318-2) | Ex. 64 (D160329) | Ex. 65 (D160331) |
|---|---|---|---|---|---|---|
| Hexanol, g | 0.00 | 0.00 | 0.00 | 0.00 | 0.00 | 0.00 |
| Catalyst, mg | 0.00 | 0.00 | 0.00 | 0.00 | 0.00 | 0.00 |
| Capping Temp., ° C. | 90 | 90 | 90 | 90 | 90 | 90 |
| Capping Time, min | 240 | 240 | 240 | 240 | 240 | 240 |
| FBV Measured | 1749 | 1208 | 1047 | 3164 | 779 | 568 |
| Dispersion Recipe | | | | | | |
| Capped glycol dispersed, g | 746.60 | 802.60 | 759.30 | 714.90 | 779.00 | 779.10 |
| DI Water, g | 1000.00 | 1000.00 | 1000.00 | 1000.00 | 1000.00 | 1000.00 |
| Dowfax 2A1, g | 23.00 | 23.00 | 23.00 | 23.00 | 23.00 | 23.00 |
| TEA, g | 14.12 | 14.12 | 14.12 | 14.12 | 14.12 | 14.12 |
| BYK 012, g | 2.30 | 2.30 | 2.30 | 2.30 | 2.30 | 2.30 |
| Silicone 65, g | 0.00 | 0.00 | 0.00 | 0.00 | 0.00 | 0.00 |
| Other, g | 0.00 | 0.00 | 0.00 | 0.00 | 0.00 | 0.00 |
| Thickener, g | 18.50 | 18.50 | 18.50 | 18.50 | 18.50 | 18.50 |
| Irganox 245, g | 11.00 | 11.00 | 11.00 | 11.00 | 11.00 | 11.00 |
| Total Weight, g | 1818.92 | 1871.52 | 1828.22 | 1783.82 | 1847.92 | 1848.02 |
| Calculated Total Solids, wt % | 43.88 | 45.46 | 44.16 | 42.77 | 44.76 | 44.76 |

TABLE 22

| Part | NCO/OH Ratio | Meq. Acid/kg CG | Meq. Monol/kg CG | 1TP100 (g/den) | 1TP200 (g/den) | 1TP300 (g/den) | 5TP100 (g/den) | 5TP200 (g/den) | 5TP300 (g/den) |
|---|---|---|---|---|---|---|---|---|---|
| Ex. 63 | 1.500 | 185.0 | 0.00 | 0.0223 | 0.0300 | 0.0420 | 0.0144 | 0.0214 | 0.0307 |
| Ex. 60 | 1.600 | 185.0 | 0.00 | 0.0266 | 0.0380 | 0.0592 | 0.0164 | 0.0251 | 0.0397 |
| Ex. 62 | 1.800 | 185.0 | 0.00 | 0.0354 | 0.0530 | 0.0911 | 0.0189 | 0.0306 | 0.0585 |
| Ex. 64 | 1.900 | 185.0 | 0.00 | 0.0394 | 0.0605 | 0.1311 | ** | ** | ** |
| Ex. 65 | 2.000 | 185.0 | 0.00 | *** | *** | *** | *** | *** | *** |
| F-120 | 1.373 | 184.5 | 0.00 | 0.0193 | 0.0256 | 0.0358 | | | 0.0223 |
| F-70 | 1.370 | 185.0 | 40.00 | 0.0137 | 0.0173 | 0.0220 | | | 0.0112 |

**Film stripes were broken before completing the 5 stretch cycles of 0-300%.
***Film was too rigid to be peeled off back paper with good enough quality for the instron test.

TABLE 23

| Part | NCO/OH Ration | DEC (%) | TM2 (g/den) | TM1 (g/den) | ELO (%) | TEN (g/den) | SET (%) |
|---|---|---|---|---|---|---|---|
| Ex. 63 | 1.500 | 16.34 | 0.0144 | 0.0094 | 522.80 | 0.1810 | 21.84 |
| Ex. 60 | 1.600 | 20.00 | 0.0156 | 0.0104 | 494.83 | 0.2191 | 21.57 |
| Ex. 62 | 1.800 | 24.83 | 0.0171 | 0.0107 | 406.67 | 0.1543 | 24.60 |
| Ex. 64 | 1.900 | ** | ** | ** | ** | ** | ** |
| Ex. 65 | 2.000 | *** | *** | *** | *** | *** | *** |
| F-120 | 1.373 | 11.11 | 0.0104 | 0.0062 | 618.78 | 0.1332 | 26.64 |
| F-70 | 1.370 | 13.01 | 0.0045 | 0.0016 | 586.56 | 0.0281 | 46.81 |

**Film stripes were broken before completing the 5 stretch cycles of 0-300%.
***Film was too rigid to be peeled off back paper with good enough quality for the instron test.

Meq Acid or Monol/kg CG, Denier, IP, DEC, TM, ELO, TEN, and SET in Tables 22 and 23 have the same meanings as above in Tables 18 and 19. In addition, for example, 1TP100 means that the film is stretched to 100% or 2 times of its original length in the first (0-300%) stretch cycle; 5TP200 means that the film sample is stretched to 200% or 3 times of its original length in the fifth (0-300%) stretch cycle. After stretching for 5 cycles, the film sample is stretched again all the way until it is broken.

As shown in the data presented in Tables 22 and 23, it was found that the best tensile properties for films of the present disclosure were made from dispersions having NCO/OH ratios in between 1.50 to 1.90, with the polymer number average molecular weight larger than 10,000. When the NCO/OH ratios were below 1.50, the films had inadequate power (stretch/recovery), and when the NCO/OH ratios were above 1.90 the films were brittle with low elongation.

Example 7: Improved Chlorine Resistance

An experiment was conducted to evaluate chlorine resistance of fabrics to which an aqueous dispersion of the present disclosure has been applied. The fabrics were tested for durability of stretch and recovery properties to chlorine exposure according to the following procedure. Chlorinated water conditions (also referred to as a chlorinated environment, to simulate a conventional chlorinated pool) were created by maintaining a water bath at 25° C., pH at 7.5, and an activated chlorine level at 3.5 ppm. The fabric samples are then fully submerged in the water bath, while they were continuously stretched from 0 to 40% at a rate of 24 times per minute for a period of 240 hours. Three times each hour, the amount of load in grams required to elongate the fabric to 40% was measured and recorded. At the end of a 240 hour exposure, the percentage change between the starting load at 0 hours and the load at other measured time periods (e.g., after 180 hours of submersion) was calculated. Additionally, after the fabrics were removed from the chlorine bath and allowed to air dry until dry to the touch, the fabrics were visually inspected for breakage or integrity of the applied and dried aqueous dispersion.

A circular knit fabric (Fabric A) was produced on a 28GG machine by combining 69% of a 40 denier-34 filament Nylon 6,6 yarn and 31% of a 55 denier spandex (LYCRA® fiber type 275Z). The fabric was made using conventional textile processing. A sample of this fabric was treated with an aqueous polyurethane dispersion of Example 2 above by conventional screen printing, followed by a curing step in which the fabric was heated to 160° C. for 60 seconds.

Performance and chlorine resistance of the fabric with and without application of the inventive aqueous polyurethane dispersion are shown in Table 24 below. Specifically, Table 24 shows the load (or fabric modulus) to 40% elongation at certain time intervals after submersion in the chlorinated environment. As shown Table 24, after application and curing of the dispersion, the fabric modulus to 40% elongation increased by 43% (from 505 g to 723 g). After testing the modulus of the samples after chorine exposure at different tested time periods, the stretch force in fabric with the dispersion ("Fabric A PLUS") compared to the stretch force in Fabric A was always 30% or more greater. At 180 hours, the increase in fabric modulus between the samples was measured as 41%, which is almost the same as the initial measured difference at 0 hours of 43%.

At 180 hours, the fabric modulus to 40% elongation increased by 41% after exposure to the chlorinated conditions (from 320 g to 453 g). This confirms an unexpected superior commercial purpose and use of the inventive aqueous polyurethane dispersion to increase modulus in a durable manner in a chlorinated environment.

After 180 hours in the chlorinated bath, Fabric A PLUS and the untreated sample of Fabric A show the same 63% decrease on an absolute basis in load to elongate. This confirms that the performance of the fabric is unchanged, on a percentage basis, between the two samples. Taken together, these results are particularly surprising considering that the dispersion did not contain additional technologies, such as those described in U.S. Pat. No. 5,626,960, which are known in the art to improve the resistance of polyurethane based materials to property degradation from exposure to activated chlorine. It is understood that should one desire to improve the performance even further, one may also include an additive, such as those described in U.S. Pat. No. 5,626,960.

TABLE 24

Load to Elongate 40% of Fabric Samples in Chlorinated Environment

| Fabric Sample | Load to Elongate 40% (g) 0 hr | 20 hr | 60 hr | 100 hr | 140 hr | 180 hr | % decrease of load after 180 hrs in chlorine environment |
|---|---|---|---|---|---|---|---|
| Fabric A (Control) | 505 | 493 | 484 | 457 | 396 | 320 | 63% |
| Fabric A PLUS (Fabric A with Dispersion Applied) | 723 | 653 | 629 | 602 | 542 | 453 | 63% |
| % Increase in Force due to the applied Dispersion | 43% | 32% | 30% | 32% | 37% | 41% | |

Example 8: Aqueous Polyurethane Dispersion Containing DMAMP

An aqueous polyurethane dispersion was prepared using DMAMP and EDA as neutralizers instead of TEA, according to the compositional makeup shown in Table 25.

TABLE 25

| Example 80 | |
|---|---|
| NCO/OH Ratio | 1.6000 |
| % NCO Aim | 2.9717 |
| Meg Acid/kg CG | 185.0 |
| Meg Monol/kg CO | 0.00 |
| Capped Glycol Recipe, Batch Wt, g | 1200 |
| T-1800 Glycol, g | 873.37 |
| PICM, g | 296.86 |
| DMPA, g | 29.78 |
| Hexanol, g | 0.00 |
| Catalyst, mg | 120 (K-KAT 640) |
| Capping Temp., ° C. | 90 |
| Capping Time, min | 150 |
| FBV Measured | |
| Dispersion Recipe | |
| Capped glycol dispersed, g | 750.00 |
| DI Water, g | 1100.00 |
| Dowfax 2A1, g | 23.00 |
| DMAMP, g | 20.33 |
| BYK 012, g | 2.30 |
| Silicone 65, g | 0.00 |
| EDA, g | 7.97 |
| Thickener, g | 18.00 |
| Irgariox 245, g | 11.00 |
| Total Weight, g | 1932.60 |
| Calculated Total Solids, wt % | 41.62 |

The film properties of Example 80 were tested. The results are shown below in Tables 26 and 27 also with the film properties for Examples 60, 62, 63 and 64 (also shown above in Tables 22 and 23).

TABLE 26

| Part | NCO/OH Ratio | Meq Acid/kg CG | 1TP100 (g/den) | 1TP200 (g/den) | 1TP300 (g/den) | 5TP100 (g/den) |
|---|---|---|---|---|---|---|
| Ex. 80 (DMAMP) | 1.600 | 185.0 | 0.0314 | 0.0446 | 0.0717 | 0.0145 |
| Ex. 63 | 1.500 | 185.0 | 0.0223 | 0.0300 | 0.0420 | 0.0144 |
| Ex. 60 | 1.600 | 185.0 | 0.0266 | 0.0380 | 0.0592 | 0.0164 |
| Ex. 62 | 1.800 | 185.0 | 0.0354 | 0.0530 | 0.0911 | 0.0189 |
| Ex. 64 | 1.900 | 185.0 | 0.0394 | 0.0605 | 0.1311 | * |

*Film stripes were broken before completing the 5 stretch cycles of 0-300%.

TABLE 27

| Part | 5TP200 (g/den) | 5TP300 (g/den) | DEC (%) | TM2 (g/den) | TM1 (g/den) | ELO (%) | TEN (g/den) | SET (%) |
|---|---|---|---|---|---|---|---|---|
| Ex. 80 (DMAMP) | 0.0233 | 0.0390 | 24.44 | 0.0122 | 0.0069 | 542.20 | 0.2247 | 34.48 |
| Ex. 63 | 0.0214 | 0.0307 | 16.34 | 0.0144 | 0.0094 | 522.80 | 0.1810 | 21.84 |
| Ex. 60 | 0.0251 | 0.0397 | 20.00 | 0.0156 | 0.0104 | 494.83 | 0.2191 | 21.57 |
| Ex. 62 | 0.0306 | 0.0585 | 24.83 | 0.0171 | 0.0107 | 406.67 | 0.1543 | 24.60 |
| Ex. 64 | * | * | * | * | * | * | | |

*Film stripes were broken before completing the 5 stretch cycles of 0-300%.

As evident from a review of Tables 26 and 27, films made using DMAMP have comparable improved tensile properties (higher load and unload power, higher tenacity) to films made using TEA.

As those skilled in the art will appreciate, numerous changes and modifications may be made to the embodiments described herein, without departing from the spirit of the disclosure. It is intended that all such variations fall within the scope of the disclosure.

What is claimed:

1. A prepolymer comprising a glycol, aliphatic diisocyanate and a diol,
   wherein a ratio of isocyanate groups in the aliphatic diisocyanate to hydroxy groups in the glycol and the diol is about 1.5 to 1.9 and wherein film prepared from the prepolymer exhibits a tensile strength of about 0.14 g/denier to about 0.24 g/denier.

2. The prepolymer of claim 1, wherein the glycol is a poly(tetramethylene ether) glycol.

3. The prepolymer of claim 1, wherein the diol is DMPA.

4. An aqueous polyurethane dispersion comprising the prepolymer of claim 1.

5. The aqueous polyurethane dispersion of claim 4, further comprising one or more of water, a neutralizer, a surfactant, a defoamer, an antioxidant, and a thickener.

6. The aqueous polyurethane dispersion of claim 4, further comprising water, a neutralizer, a surfactant, a defoamer, an antioxidant, and a thickener.

7. The aqueous polyurethane dispersion of claim 4, containing about 30% to about 48% prepolymer, based upon total weight of the aqueous polyurethane dispersion.

8. An aqueous polyurethane dispersion comprising:
   a prepolymer comprising:
      a glycol;
      an aliphatic diisocyanate; and
      a diol,
   wherein a ratio of isocyanate groups in the aliphatic diisocyanate to hydroxy groups in the glycol and the diol is 1.5 to 1.9; and
   a neutralizer comprising 2-Dimethylamino-2-Methyl-1-Propanol (DMAMP),
   wherein a film prepared from the aqueous polyurethane dispersion exhibits a tensile strength of about 0.14 g/denier to about 0.24 g/denier.

9. The aqueous polyurethane dispersion of claim 8, wherein the dispersion contains less than about 0.1% of triethylamine (TEA), based upon total weight of the aqueous polyurethane dispersion.

10. The aqueous polyurethane dispersion of claim 8, wherein the glycol is a poly(tetramethylene ether) glycol.

11. The aqueous polyurethane dispersion of claim 8, wherein the diol is DMPA.

12. A shaped article comprising a dried aqueous polyurethane dispersion, which comprises the prepolymer of claim 1.

13. The shaped article of claim 12, wherein the shaped article is a film.

14. The shaped article of claim 13, having a tensile strength of about 0.14 g/denier to about 0.24 g/denier.

15. The shaped article of claim 14, having a tensile strength of about 0.15 g/denier to about 0.22 g/denier.

16. The shaped article of claim 14, having a reduction in its CIE whiteness index value of about 30% to about 40% after exposure to about 195° C. for about five minutes.

17. The shaped article of claim 14, having a reduction in its CIE whiteness index value of less than about 2% after UV exposure for about 8 hours.

18. The shaped article of claim 14, having a reduction in its CIE whiteness index value of less than about 5% after exposure to NO2 for about 24 hours.

19. An article comprising the shaped article of claim 12.

20. The article of claim 19, wherein the aqueous polyurethane dispersion is applied to a seam or support area of the article.

21. The article of claim 19, wherein the article has improved whiteness retention where the shaped article has been applied.

* * * * *